US012592764B2

(12) United States Patent
Zhang et al.

(10) Patent No.: US 12,592,764 B2
(45) Date of Patent: *Mar. 31, 2026

(54) SYSTEMS AND METHODS FOR CONTROL SIGNALING FOR BEAM SEARCHING LATENCY REDUCTION

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Saratoga, CA (US); Fangli Xu, Beijing (CN); Haijing Hu, Los Gatos, CA (US); Haitong Sun, Cupertino, CA (US); Hong He, San Jose, CA (US); Wei Zeng, Saratoga, CA (US); Weidong Yang, San Diego, CA (US); Yeong-Sun Hwang, Germering (DE); Yuchul Kim, Cupertino, CA (US); Yuqin Chen, Beijing (CN)

(73) Assignee: APPLE INC., Cupertino, CA (US)

( * ) Notice: Subject to any disclaimer, the term of this patent is extended or adjusted under 35 U.S.C. 154(b) by 315 days.

This patent is subject to a terminal disclaimer.

(21) Appl. No.: 18/477,361

(22) Filed: Sep. 28, 2023

(65) Prior Publication Data

US 2024/0022309 A1      Jan. 18, 2024

Related U.S. Application Data

(63) Continuation of application No. 17/593,562, filed as application No. PCT/CN2020/090523 on May 15, 2020, now Pat. No. 11,838,089.

(51) Int. Cl.
*H04B 7/06* (2006.01)
*H04B 7/08* (2006.01)
*H04L 5/00* (2006.01)

(52) U.S. Cl.
CPC ......... *H04B 7/06968* (2023.05); *H04B 7/088* (2013.01); *H04L 5/0048* (2013.01)

(58) Field of Classification Search
CPC .. H04B 7/06968; H04B 7/088; H04B 7/0696; H04L 5/0048
See application file for complete search history.

(56) References Cited

U.S. PATENT DOCUMENTS

| | | | | |
|---|---|---|---|---|
| 11,838,089 B2 * | 12/2023 | Zhang | ................ | H04B 7/06968 |
| 2014/0301310 A1 * | 10/2014 | Kuo | .................... | H04B 7/0617 |
| | | | | 370/329 |

(Continued)

FOREIGN PATENT DOCUMENTS

| | | |
|---|---|---|
| CN | 109076556 A | 12/2018 |
| CN | 109565432 A | 4/2019 |

(Continued)

OTHER PUBLICATIONS

U.S. Appl. No. 17/593,562, Notice of Allowance, Oct. 12, 2023, 8 pages.

(Continued)

*Primary Examiner* — Kenneth T Lam
(74) *Attorney, Agent, or Firm* — Dorsey & Whitney LLP

(57) ABSTRACT

Systems and methods for control signaling for beam searching latency reduction are disclosed herein. A g Node B (gNB) may determine that a first Synchronization Signal Block (SSB) and a second SSB are to be spatially correlated and may select a first transmit (Tx) beam to transmit the first SSB and a second Tx beam to transmit the second SSB accordingly. The gNB may also transmit a correlation message including spatial correlation information to help a UE determine the spatial correlation. The UE may measure the first SSB on a first subset of a plurality of receive (Rx) beams and measure the second SSB on a second subset of the plurality of Rx beams, and select an Rx beam for one or both. In some embodiments, channel state information reference signals (CSI-RS) that are quasi co-located (QCLed) with a given SSB may be measured in place of the SSB.

19 Claims, 13 Drawing Sheets

(56) References Cited

U.S. PATENT DOCUMENTS

| 2019/0074880 A1 | 3/2019 | Frenne et al. |
| 2019/0306924 A1* | 10/2019 | Zhang .................. H04L 5/0051 |
| 2020/0044806 A1* | 2/2020 | Jassal .................... H04L 5/0094 |
| 2020/0106647 A1 | 4/2020 | Chen et al. |
| 2020/0119899 A1 | 4/2020 | Qin et al. |
| 2022/0210761 A1 | 6/2022 | Bi et al. |
| 2022/0330069 A1 | 10/2022 | Zhang |
| 2023/0164779 A1* | 5/2023 | Chung .................. H04W 16/28 370/329 |

FOREIGN PATENT DOCUMENTS

| WO | 2020025010 A1 | 2/2020 |
| WO | 2020041196 A1 | 2/2020 |
| WO | 2020063757 A1 | 4/2020 |

OTHER PUBLICATIONS

U.S. Appl. No. 17/593,562 , Non-Final Office Action, Apr. 7, 2023, 14 pages.

U.S. Appl. No. 17/593,562 , Final Office Action, Jul. 31, 2023, 17 pages.

Intel Corporation , "On Beam Management Enhancement", R1-1904314, 3GPP TSG RAN WG1 Meeting #96bis, Xi'an, China, Agenda Item 7.2.8.3, Apr. 8-12, 2019, 14 pages.

Intel Corporation , "On Beam Management Enhancement", R1-1906816, 3GPP TSG RAN WG1 Meeting #97, Reno, Nevada, USA, Agenda Item 7.2.8.3, May 13-17, 2019, 17 pages.

PCT/CN2020/090523 , International Search Report and Written Opinion, Feb. 18, 2021, 9 pages.

Intel Corporation, "On Beam Management Overhead and Latency Reduction", R1-1808719, 3GPP TSG RAN WG1 Meeting #94, Gothenburg, Sweden, Agenda Item 7.2.8, Aug. 20-24, 2018, 5 pages.

* cited by examiner

SYSTEMS AND METHODS FOR CONTROL SIGNALING FOR BEAM SEARCHING LATENCY REDUCTION

TECHNICAL FIELD

This application relates generally to wireless communication systems, and more specifically to control signaling for beam searching latency reduction.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

To increase a link budget between a gNB and a UE, both the gNB and the UE may utilize analog beamforming for high frequency bands. A relatively good gNB-UE beam pair can help to increase the coverage as opposed to a lower quality gNB-UE beam pair.

In some systems, the UE measures Synchronization Signal Block (SSB) or Channel State Information Reference Signal (CSI-RS) resources with different receive (Rx) beams in order to determine a good gNB-UE pair between a given SSB and/or CSI-RS and the given Rx beam. In some systems, the gNB performs this task without first receiving any corresponding information from the gNB. In these cases, the UE performs the beam search for each SSB and/or CSI-RS independently.

Figure 1:
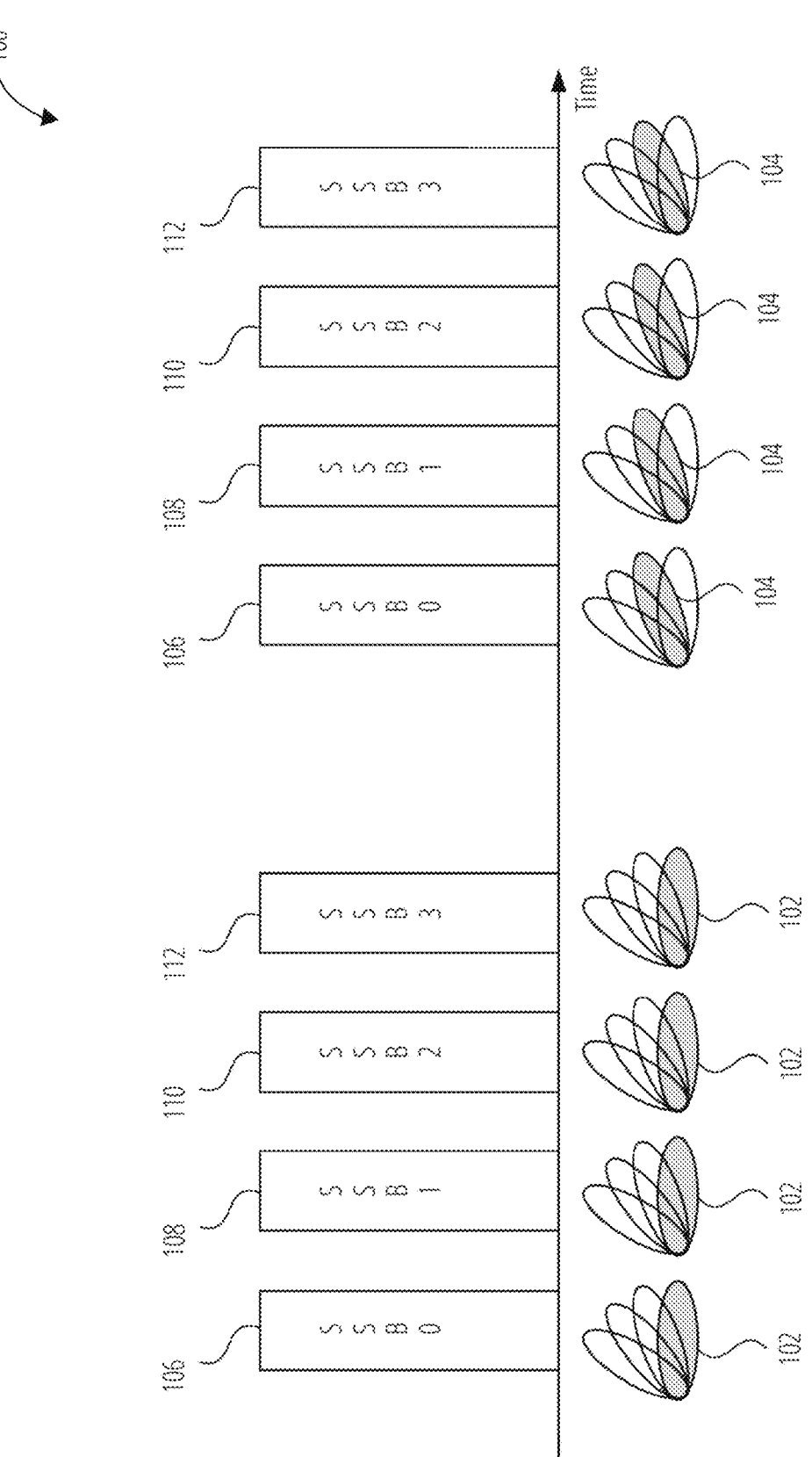
FIG. 1 illustrates a timeline of a beam search performed for a plurality of Synchronization Signal Blocks (SSBs) performed independently.

FIG. 1 illustrates a timeline 100 of a beam search performed for a plurality of SSBs performed independently. First, the UE uses a first Rx beam 102 to search for the SSB0 106. Then the UE uses the first Rx beam 102 to search for an SSB1 108. Then the UE uses the first Rx beam 102 to search for an SSB2 110. Then the UE uses the first Rx beam 102 to search for the SSB3 112. The UE may continue using the first Rx beam 102 to search for as many SSBs as are being used in this manner.

Then the UE uses a second Rx beam 104 to search for the SSB0 106. Then the UE uses a second Rx beam 104 to search for the SSB1 108. Then the UE uses the second Rx beam 104 to search for the SSB2 110. Then the UE uses the second Rx beam 104 to search for the SSB3 112. The UE may continue using the second Rx beam 104 to search for as many SSBs are being used in this manner.

The above process may continue for up to as many beams (e.g., beams other than the first Rx beam 102 and second Rx beam 104) that the UE is configured to use/search on.

Systems as described in relation to FIG. 1 may be able to be improved (e.g., perform a beam search in less time, resulting in lower latency beam searching) when information about a spatial correlation of two or more searched-for signals is provided by the gNB to the UE (or is otherwise known at the UE).

Signals that are spatially correlated may be understood to be signals that are transmitted by a gNB such that a projected measurement (e.g., a Reference Signal Receive Power (RSRP) measurement or a Signal-to-Interference Plus Noise Ratio (SINR) measurement) difference of a reception at an Rx beam of the UE of a first correlated signal on a first Tx beam and a reception at the same Rx beam of the UE of a second correlated signal on a second Tx beam is less than a threshold. For example, an SSB transmitted on a first beam may be spatially correlated with a second SSB, a CSI-RS, or another signal that is transmitted on a second beam if a change in a signal measurement (e.g., RSRP or SINR) between the two signals at the same Rx beam of the UE is not projected to exceed a threshold. As another example, a CSI-RS transmitted on a first beam may be spatially correlated with an SSB, a second CSI-RS, or another signal that is transmitted on a second beam if a change in a signal measurement (e.g., RSRP or SINR) measurement between the two signals at the same Rx beam of the UE is not projected to exceed a threshold. Spatial correlation may include, but is not limited to, signals that are quasi co-located (QCLed) with each other (e.g., QCL Type-D). A gNB (or other entity) that is determining spatial correlations between signals and transmitting them accordingly may be said to be transmitting signals according to a spatial correlation configuration.

For some signals that are spatially correlated, a UE can perform beam searching jointly by leveraging its understanding about the spatial correlation of said signals. Among other cases, embodiments disclosed herein that describe this behavior may help to improve with beam searching for secondary cell (SCell) activation, beam searching for handover, beam searching for new beam identification from beam failure, beam searching for initial access, and/or beam searching for assistant Transmission Reception Point (TRP) discovery for multi-TRP operation.

Figure 2:
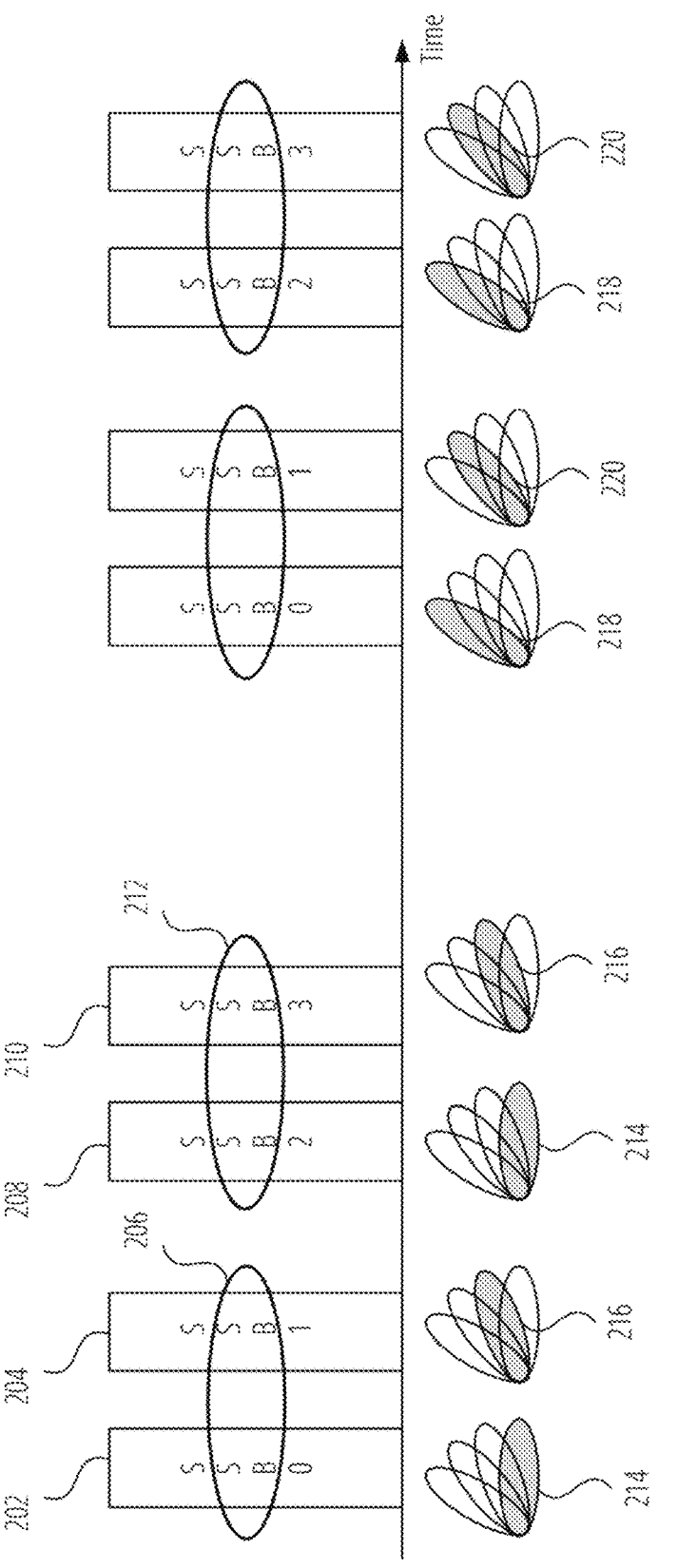
FIG. 2 illustrates a timeline of a beam search that leverages an understanding of spatial correlation of signals, according to an embodiment.

FIG. 2 illustrates a timeline 200 of a beam search that leverages an understanding of spatial correlation of signals, according to an embodiment. In FIG. 2, a UE is aware that the SSB0 202 and the SSB1 204 have a first spatial correlation 206. Further, the UE is aware that the SSB2 208 and the SSB3 210 have a second spatial correlation 212.

The UE then proceeds to use a first Rx beam 214 to search for the SSB0 202. The UE then proceeds to search for the SSB1 204 using the second Rx beam 216. Because the SSB0 202 and the SSB SSB1 204 have a first spatial correlation 206 (and this is known at the UE), it is inferred that a signal measurement of the SSB1 204 on the first Rx beam 214, had it actually been determined by the UE, would have changed relatively little from the signal measurement of the SSB0 202 as already measured on the first Rx beam 214. Accordingly, the UE can estimate an Rx receive beam match between the SSB1 204 and the first Rx beam 214 without actually taking the corresponding measurement directly. Further, based on this knowledge of spatial correlation, it is further inferred that a signal measurement of the SSB0 202 on the second Rx beam 216, had it actually been determined by the UE, would have changed relatively little from the signal measurement of the SSB1 204 as already measured on the second Rx beam 216. Accordingly, the UE can estimate a Rx receive beam match between the SSB0 202 and the second Rx beam 216 without actually taking the corresponding measurement directly.

The UE then proceeds to use the first Rx beam 214 to search for an SSB2 208 and the second Rx beam 216 to search for an SSB3 210. Because of the second spatial correlation 212, the UE can infer Rx receive beam match information about the first Rx beam 214 relative to the SSB3 210 and about the second Rx beam 216 relative to the SSB2 208 in a manner similar that described in relation to SSB1 204 and SSB0 202 above.

The above process may then be repeated in relation to a third Rx beam 218 and a fourth Rx beam 220.

At the end of the above process, the UE has Rx receive beam match information (whether measured or estimated) for the first Rx beam 214, the second Rx beam 216, the third Rx beam 218, and the fourth Rx beam 220 for each of the SSB0 202, the SSB1 204, the SSB2 208, and the SSB3 210. Compared to the process in FIG. 1. (which spans over the same amount of SSB transmissions), the UE has much more information. (In the example of FIG. 1, the UE ends the process with Rx beam match information for only the first Rx beam 102 and the second Rx beam 104 relative to each of the SSB0 106, the SSB1 108, the SSB2 110, and the SSB3 112.)

The spatial correlation between signals (e.g., SSBs, CSI-RSs) may be already known to the UE due to a pre-determined signal correlation pattern used by the gNB. Alternatively, the spatial correlation between signals may be known to the UE due to the application of a pre-determined rule. For example, in some cases it may be that the UE assumes that all relevant signals (e.g., all SSBs and/or all CSI-RSs) transmitted in the same slot and/or subframe are spatially correlated.

In some embodiments, the gNB can provide the spatial correlation information for, for example, one or more SSBs and/or CSI-RSs to reduce UE beam searching latency. This spatial correlation information could be applied as to SSBs and/or CSI-RSs within the same serving cell, and/or it may be applied to SSBs and/or CSI-RSs across a plurality of serving cells. In some embodiments, this signaling may come from higher layer signaling (e.g., System Information Block (SIB) signaling and/or Radio Resource Control (RRC) messaging). In other embodiments, this signaling it may come from physical layer signaling (e.g., Master Information Block (MIB) signaling).

Figure 3:
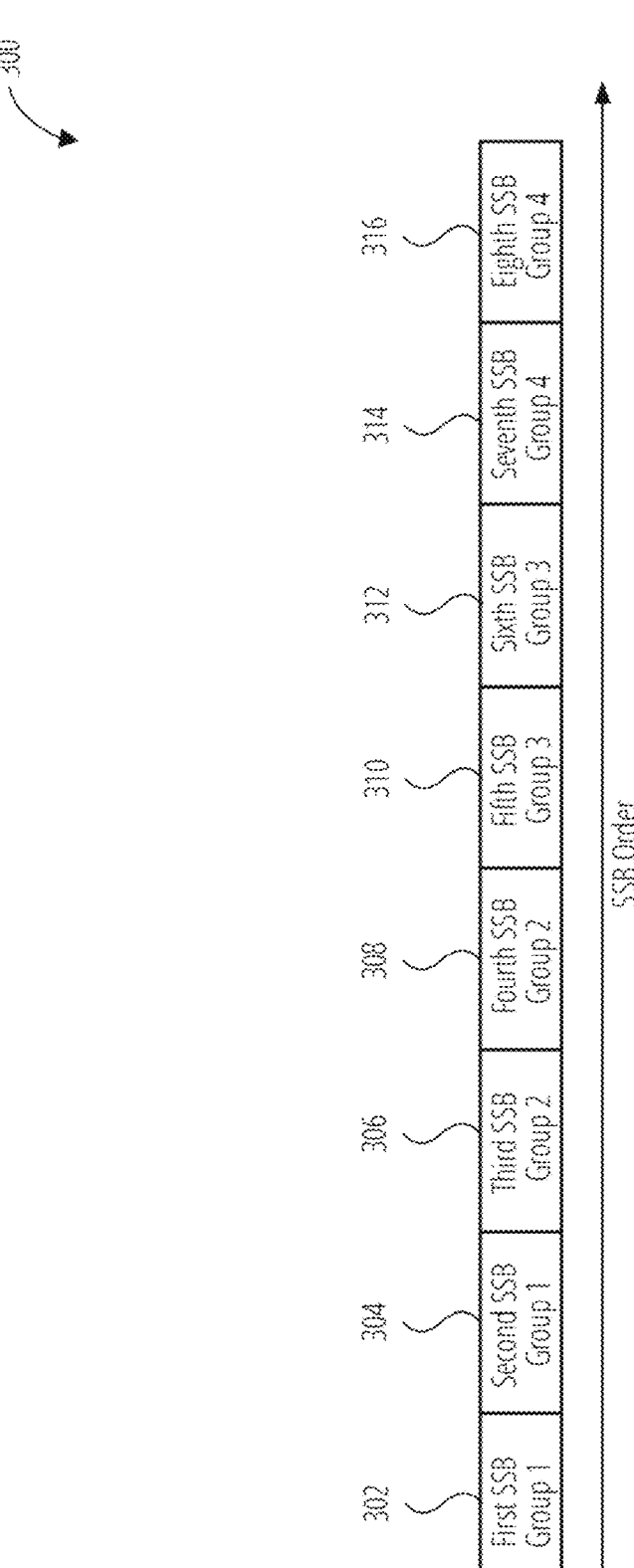
FIG. 3 includes a diagram of the result of a use by a UE of a number of groups of spatially correlated signals parameter provided by a gNB, according to an embodiment FIG. 4 includes a diagram of the result of a use by a UE of a number of groups of spatially correlated signals parameter provided by a gNB, according to an embodiment.

In some embodiments that use gNB signaling to provide spatial correlation information, the gNB may send a parameter indicating the number of groups of spatially correlated signals (N). The UE may receive this parameter and may use it to determine the correlations between received SSBs FIG. 3 includes a diagram 300 of the result of a use by a UE of a number of groups of spatially correlated signals parameter provided by a gNB, according to an embodiment. In FIG. 3, there are 8 total SSBs and the gNB has indicated that there are 4 groupings of spatially correlated SSBs (in other words, N=4). The UE then divides the total (8) by the number of groupings parameter (4) and determines that each spatially correlated group has 2 SSBs. The UE therefore assumes that that every consecutive 2 SSBs are spatially correlated. Accordingly, the UE will treat the first SSB 302 and the second SSB 304 as spatially correlated (group 1), the third SSB 306 and the fourth SSB 308 as spatially correlated (group 2), the fifth SSB 310 and sixth SSB 312 as spatially correlated (group 3), and the seventh SSB 314 and the eighth SSB 316 as spatially correlated (group 4). Note that the ordinals used in the discussion of FIG. 3 (e.g., first, fifth) are given for explanatory purposes, and are not intended to be mapped to an SSB identifier (e.g., SSB1, SSB3) that may be used by the system.

Figure 4:
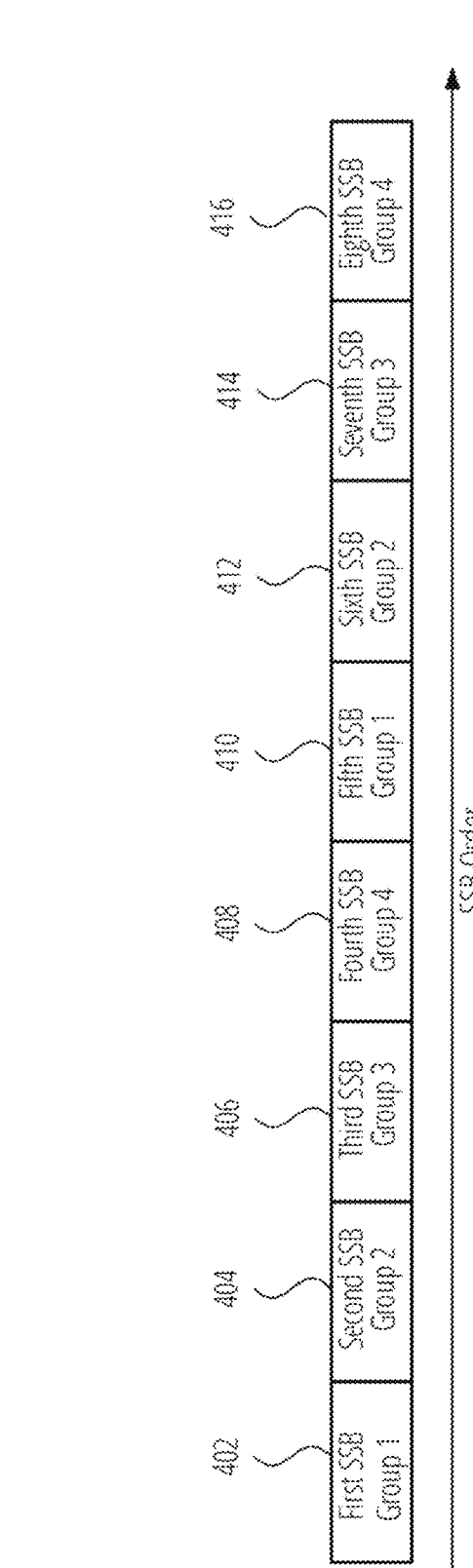

FIG. 4 includes a diagram 400 of the result of a use by a UE of a number of groups of spatially correlated signals parameter provided by a gNB, according to an embodiment. In FIG. 3, there are 8 total SSBs and the gNB has indicated that there are 4 groupings of spatially correlated SSBs (in other words, N=4). The UE then assumes that for every k from 1 . . . N, the SSBs in a group can be calculated using the pattern {SSB k, SSB N+k, SSB 2N+k, SSB 3N+k, . . . }, resulting in every kth SSB being understood to be spatially correlated. This pattern is followed for as many as multiples of N are needed to cover the entire SSB set.

In the example of FIG. 4, only {SSB k, SSB N+k} is needed, due to N=4 and the total of 8 SSBs. Accordingly, the UE will treat the first SSB 402 and the fifth SSB 410 as spatially correlated (group 1), the second SSB 404 and the sixth SSB 412 as spatially correlated (group 2), the third SSB 406 and the seventh SSB 414 as spatially correlated (group 3), and the fourth SSB 408 and the eighth SSB 416 as spatially correlated (group 4). Note that the ordinals used in the discussion of FIG. 4 (e.g., first, fifth) are given for explanatory purposes, and not intended to be mapped to an SSB identifier (e.g., SSB1, SSB3) that may be used by the system.

In some embodiments that use gNB signaling to provide spatial correlation information, the gNB may use signaling that communicates a list of SSBs that are spatially correlated. This list may include, for one or more given SSBs on the list, an identification of one or more other SSBs to which the given SSB is spatially correlated.

In some embodiments that use gNB signaling to provide spatial correlation information, the gNB may use signaling that configures groupings of SSBs that are spatially correlated. Groupings so configured may be different than, e.g., the groupings discussed relative to FIG. 3 and FIG. 4 above, at least in that in this case the gNB may configure a different (variable) amount of SSBs per group.

In some embodiments that use gNB signaling to provide spatial correlation information, the gNB may use signaling that indicates one of a plurality of candidate patterns of correlated SSBs. These candidate correlation patterns may be known at the UE. The UE may then apply the candidate correlation pattern corresponding to the received indication in order to determine which SSBs are spatially correlated.

It is further contemplated that a CSI-RS associated to (sent on the same beam as) one or more SSBs may be useful in methods disclosed herein. Accordingly, it may be useful to understand when a CSI-RS is quasi co-located (QCLed) to an SSB and/or spatially correlated with another CSI-RS.

A spatial correlation of a CSI-RS could be determined based on the SSB which is configured as its source reference signal of QCL-typeD. In some embodiments, it may be that CSI-RS resources are considered spatially correlated when they are configured with the same SSB as the source reference signal of QCL-typeD.

In other embodiments, it may be that CSI-RS resources are considered spatially correlated based on the spatial correlations of the respective SSBs which are configured as the source reference signal of QCL-typeD. In this case, a CSI-RS may be considered spatially QCLed with SSBs that are spatially correlated with the source SSB for QCL-typeD for the CSI-RS. Further, the CSI-RS may be considered spatially correlated with CSI-RS resources whose source QCL-typeD SSB is spatially correlated with its own source QCL-typeD SSB.

In cases where the QCL-typeD is not configured for a CSI-RS, the UE shall not assume the CSI-RS is spatially correlated with other CSI-RSs or SSBs. In alternative embodiments, the UE may expect the QCL-typeD for CSI-RS to be configured (when it is applicable).

Figure 5:
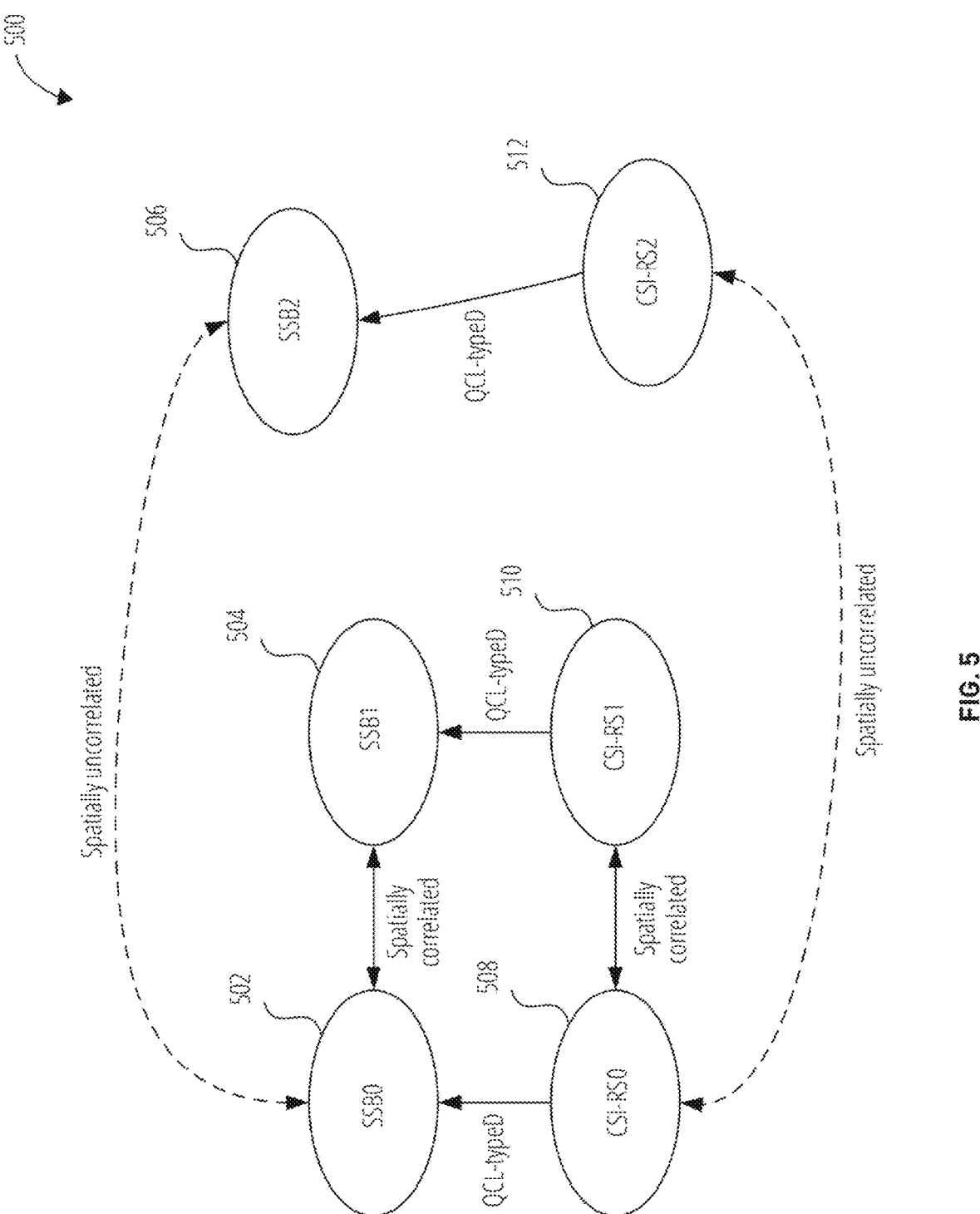
FIG. 5 illustrates a diagram illustrating possible Synchronization Signal Block (SSB) and/or Channel State Information Reference Signal (CSI-RS) relationships, according to embodiments herein.

FIG. 5 illustrates a diagram 500 illustrating possible SSB and/or CSI-RS relationships, according to embodiments herein. The SSB0 502 may be spatially correlated with the SSB1 504, but not spatially correlated with the SSB2 506. The SSB0 502 may be QCLed (under QCL-typeD) with the CSI-RS0 508. The SSB1 504 may be QCLed (under QCL-typeD) with the CSI-RS1 510. The SSB2 506 may be QCLed (under QCL-typeD) with the CSI-RS2 512. Finally, because the SSB0 502 and the SSB1 504 are spatially correlated, it may be that their respective QCLed CSI-RSs, the CSI-RS0 508 and the CSI-RS1 510, are also considered to be spatially correlated. Because neither of SSB0 502 nor SSB1 504 are spatially correlated with SSB2 506, the CSI-RS2 512 that is QCLed with the SSB2 506 is not considered spatially correlated with either of their respective CSI-RSs, the CSI-RS0 508 and the CSI-RS1 510.

Embodiments disclosed herein are also contemplated to be compatible with multi-Transmission Reception Point (multi-TRP) enabled networks. In these embodiments, the gNB may provide one or more of the following sets of information to the UE (e.g., by higher layer signaling): an actually transmitted SSB pattern used by the assistant TRP, a transmission power of one or more SSBs from the assistant TRP, a relative transmission power of one or more SSBs from the assistant TRP, and/or a physical cell ID of the assistant TRP. One or more of these sets of information may be sent in, e.g., a correlation message.

In some embodiments that use gNB signaling to provide spatial correlation information, the gNB may transmit to the UE spatial correlation information associated with the assistant TRP's SSB spatial correlation configuration. It may be that this information may be formed by the gNB and used by the UE (relative to the TRP SSBs) in any manner described herein.

In embodiments involving a neighbor TRP or cell search, it may be that an SSB periodicity is relatively large. In these cases, the gNB may configure one or more CSI-RSs to assist a UE in cell discovery in a manner that is quicker than using just the SSBs alone. In some embodiments, the one or more CSI-RSs have a much wider bandwidth compared to an associated SSB, and therefore their use may result in a more accurate and faster search than using SSB alone (even apart from considering the additional detection opportunities given relative to the use case of SSBs alone). CSI-RSs may be configured as assistance signals for cell search and beam measurement relative to their corresponding SSBs. Accordingly, one or more CSI-RSs that are QCLed (e.g., Type-D) with their corresponding SSBs (e.g., in the manner described in FIG. 5 above) may operate as a reference signal that is useful (e.g., to generate Rx receive beam match information) relative to its corresponding SSB. In some embodiments, these CSI-RSs may be, e.g., aperiodic CSI-RSs (A-CSI-RSs).

Figure 6:
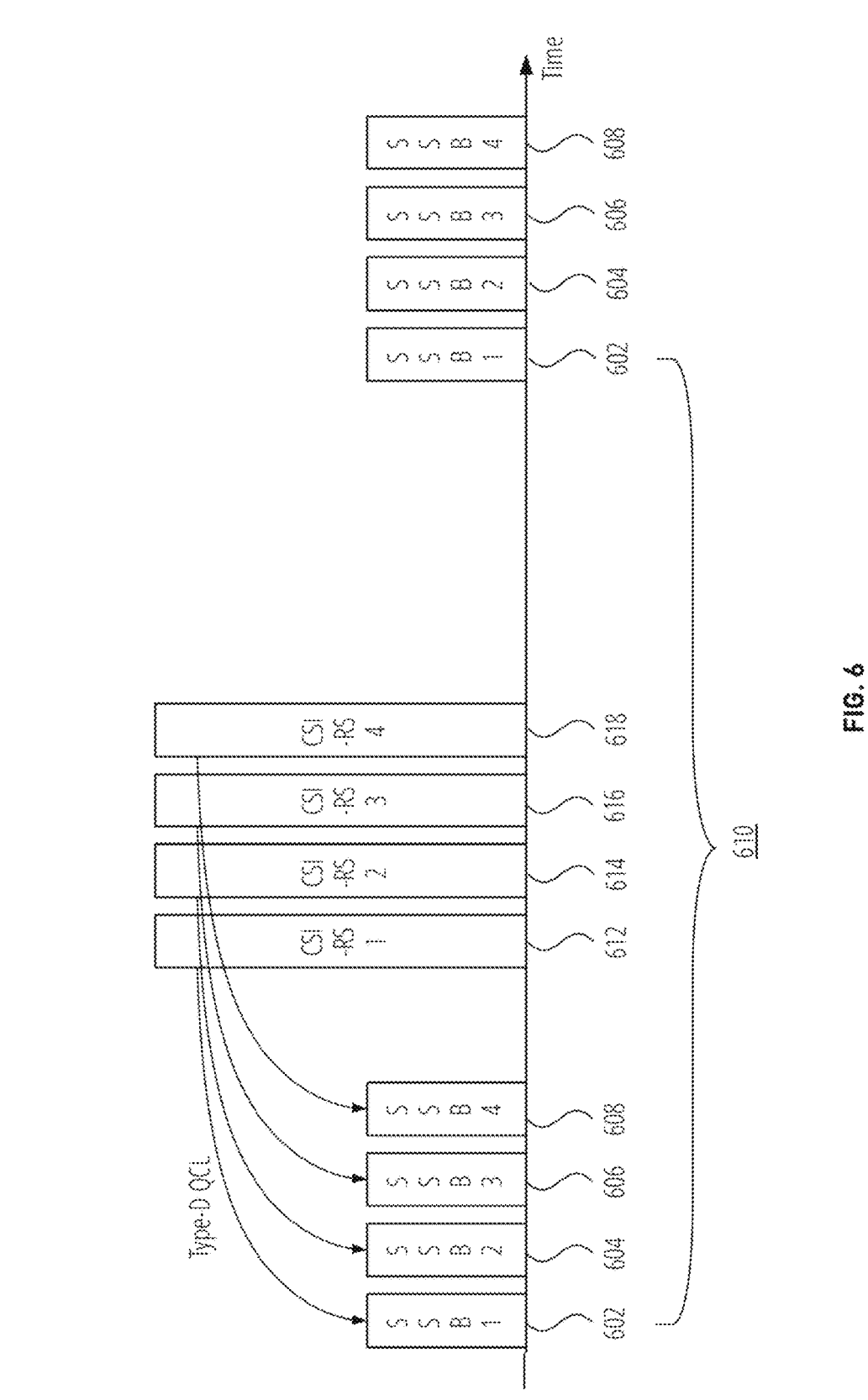
FIG. 6 illustrates a timeline of the use a plurality of Channel State Information Reference Signals (CSI-RSs), according to an embodiment.

FIG. 6 illustrates a timeline 600 of the use a plurality of CSI-RSs, according to an embodiment. A gNB may transmit a set of SSBs that includes an SSB1 602, and SSB2 604, an SSB3 606, and an SSB4 608 with a periodicity 610 that is relatively large. To speed up the neighbor TRP, beam, or other search, the gNB may configure a CSI-RS for each of the SSBs 602-608. For example, the gNB may configure a CSI-RS1 612 that is QCLed (Type-D) with the SSB1 602, a CSI-RS2 614 that is QCLed (Type-D) with the SSB2 604, a CSI-RS3 616 that is QCLed (Type-D) with the SSB3 606, and a CSI-RS4 618 that is QCLed (Type-D) with the SSB4 608. The availability of the CSI-RS1 612 to CSI-RS4 618 may allow the UE to take measurements on an Rx beam using a CSI-RS instead of its QCLed SSB, speeding up the process.

When the network has multiple panels and is capable of simultaneously transmitting multiple beams, then multiple CSI-RSs may be arranged according to Frequency Division Multiplexing (FDM) to make the Tx beam sweep faster. In these embodiments, the UE can measure the wideband signal, and the CSI-RS quality (e.g., RSRP or SINR) of multiple CSI-RSs at one time to obtain best Tx beam much faster. Further, the same CSI-RS can be repeated in time domain to further assist UE in Rx beam sweep. In some embodiments, these CSI-RSs may be, e.g., A-CSI-RSs.

Figure 7:
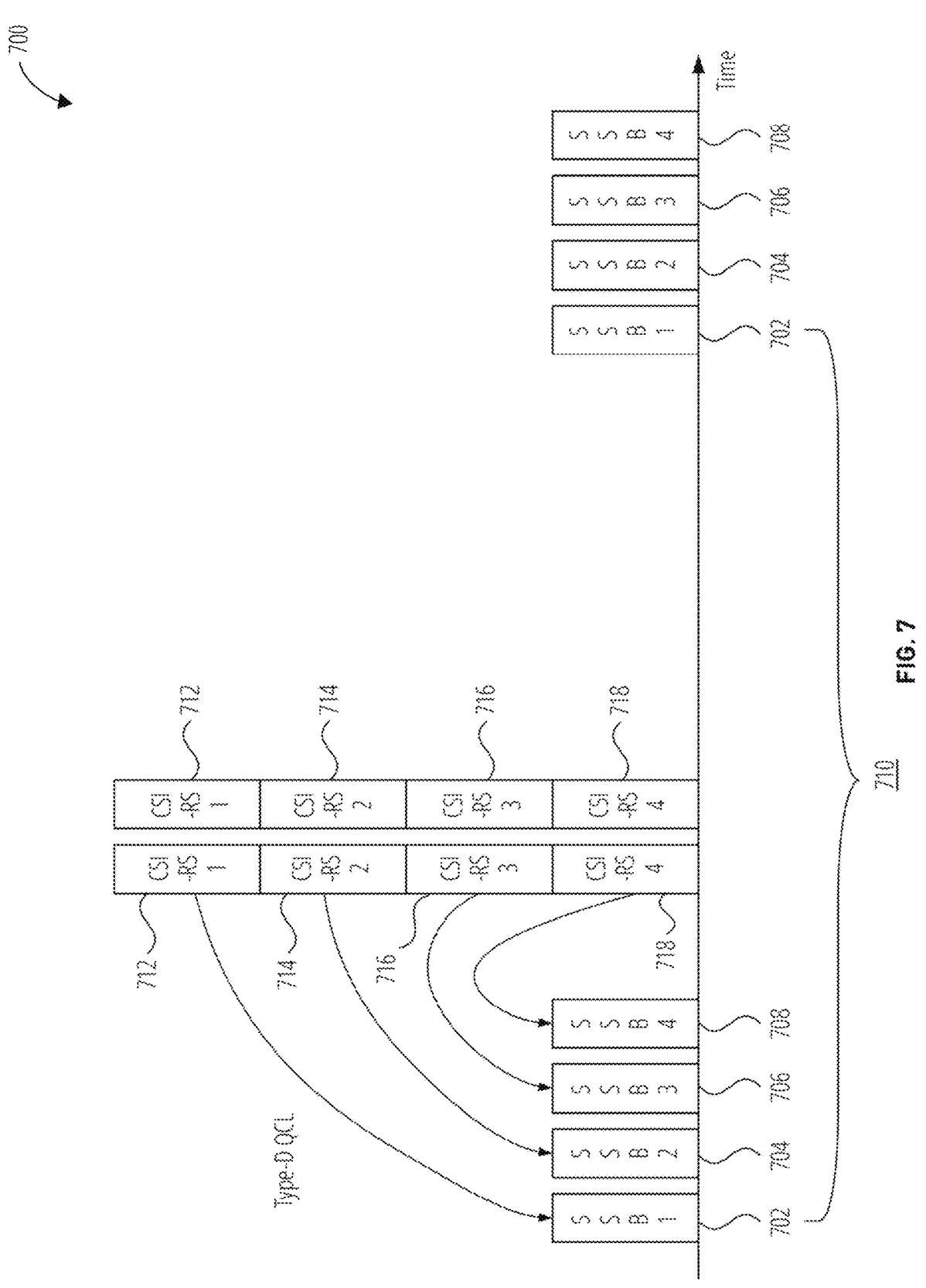
FIG. 7 illustrates a timeline of the use of a plurality of Channel State Information Reference Signals (CSI-RSs) arranged according to Frequency Division Multiplexing (FDM), according to an embodiment.

FIG. 7 illustrates a timeline 700 of the use of a plurality of CSI-RSs arranged according to FDM, according to an embodiment. A gNB may transmit a set of SSBs that includes an SSB1 702, an SSB2 704, an SSB3 706, and an SSB4 708 with a periodicity 710 that is relatively large. To speed up the neighbor TRP, beam, or other search, the gNB may configure a SCI-RS for each of the SSBs 702-708. For example, the gNB may configure a CSI-RS1 712 that is QCLed (Type-D) with the SSB1 702, a CSI-RS2 714 that is QCLed (Type-D) with the SSB2 704, a CSI-RS3 716 that is QCLed (Type-D) with the SSB3 706, and a CSI-RS4 718 that is QCLed (Type-D) with the SSB4 708. Further, as shown, each of the CSI-RSs 712-718 may be arranged according to FDM so that more than one (in the illustrated case, all four) of them may be sent at the same time. The use of FDM may conserve time resources such that a sending of one or more of the CSI-RSs 712-718 may be repeated at a different time (as illustrated). The availability of the CSI-RSs 712-718 may allow the UE to take measurements on an Rx beam using a CSI-RS instead of its QCLed SSB, speeding up the process.

Figure 8:
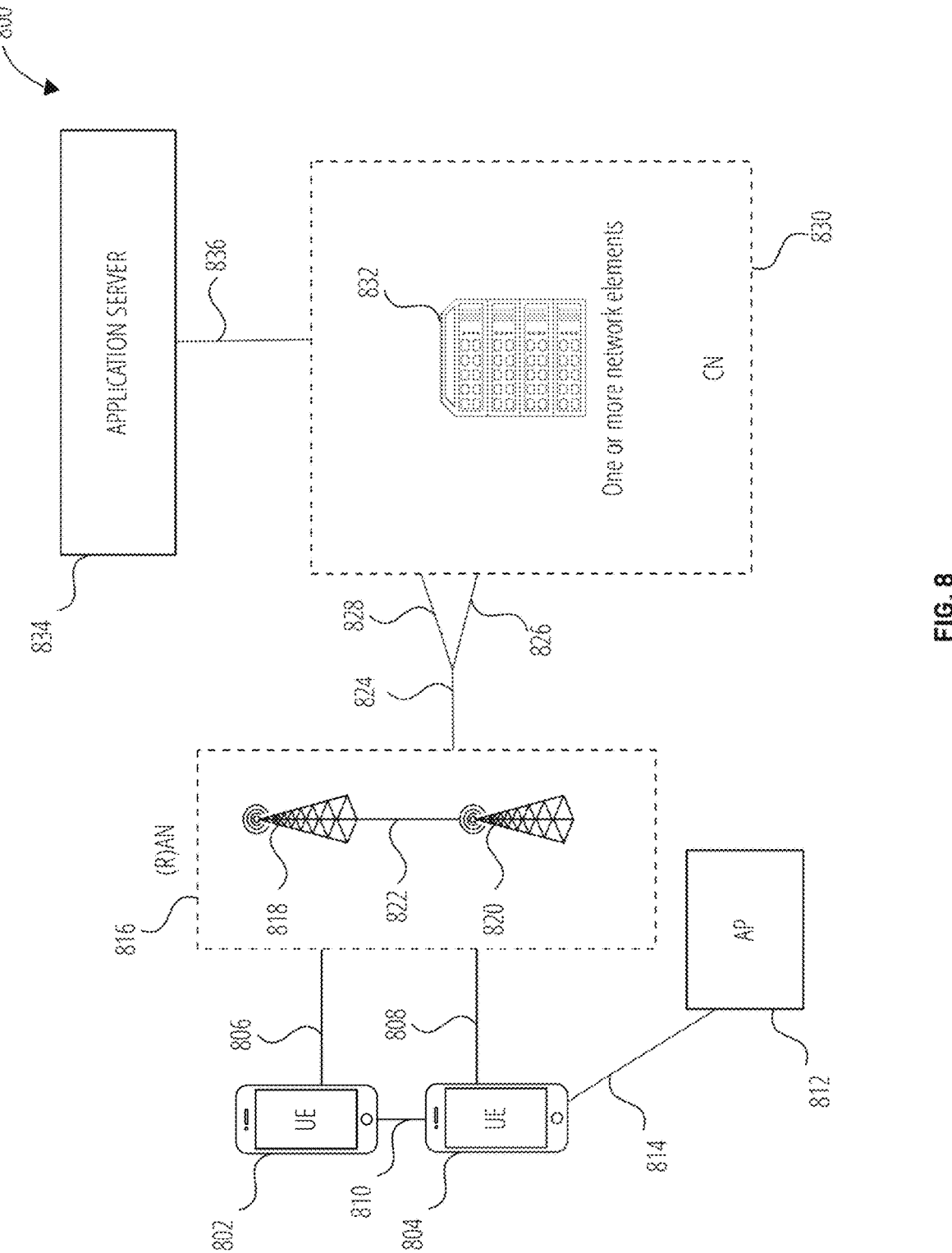
FIG. 8 illustrates a system in accordance with one embodiment.

FIG. 8 illustrates an example architecture of a system 800 of a network, in accordance with various embodiments. The following description is provided for an example system 800 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 8, the system 800 includes UE 802 and UE 804. In this example, the UE 802 and the UE 804 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, MTC devices, M2M, IoT devices, and/or the like.

In some embodiments, the UE 802 and/or the UE 804 may be IoT UEs, which may comprise a network access layer designed for low power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 802 and UE 804 may be configured to connect, for example, communicatively couple, with an access node or radio access node (shown as (R)AN 816). In embodiments, the (R)AN 816 may be an NG RAN or a SG RAN, an E-UTRAN, or a legacy RAN, such as a UTRAN or GERAN. As used herein, the term "NG RAN" or the like may refer to a (R)AN 816 that operates in an NR or SG system, and the term "E-UTRAN" or the like may refer to a (R)AN 816 that operates in an LTE or 4G system. The UE 802 and UE 804 utilize connections (or channels) (shown as connection 806 and connection 808, respectively), each of which comprises a physical communications interface or layer (discussed in further detail below).

In this example, the connection 806 and connection 808 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a SG protocol, a NR protocol, and/or any of the other communications protocols discussed herein. In embodiments, the UE 802 and UE 804 may directly exchange communication data via a ProSe interface 810. The ProSe interface 810 may alternatively be referred to as a sidelink (SL) interface 810 and may comprise one or more logical channels, including but not limited to a PSCCH, a PSSCH, a PSDCH, and a PSBCH.

The UE 804 is shown to be configured to access an AP 812 (also referred to as "WLAN node," "WLAN," "WLAN Termination," "WT" or the like) via connection 814. The connection 814 can comprise a local wireless connection, such as a connection consistent with any IEEE 802.11 protocol, wherein the AP 812 would comprise a wireless fidelity (Wi-Fi®) router. In this example, the AP 812 may be connected to the Internet without connecting to the core network of the wireless system (described in further detail below). In various embodiments, the UE 804, (R)AN 816, and AP 812 may be configured to utilize LWA operation and/or LWIP operation. The LWA operation may involve the UE 804 in RRC_CONNECTED being configured by the RAN node 818 or the RAN node 820 to utilize radio resources of LTE and WLAN. LWIP operation may involve the UE 804 using WLAN radio resources (e.g., connection 814) via IPsec protocol tunneling to authenticate and encrypt packets (e.g., IP packets) sent over the connection 814. IPsec tunneling may include encapsulating the entirety of original IP packets and adding a new packet header, thereby protecting the original header of the IP packets.

The (R)AN 816 can include one or more AN nodes, such as RAN node 818 and RAN node 820, that enable the connection 806 and connection 808. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or SG system (for example, a gNB), and the term "E-UTRAN node" or the like may refer to a RAN node that operates in an LTE or 4G system 800 (e.g., an eNB). According to various embodiments, the RAN node 818 or RAN node 820 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN node 818 or RAN node 820 may be implemented as one or more software entities running on server computers as part of a virtual network, which may be referred to as a CRAN and/or a virtual baseband unit pool (vBBUP). In these embodiments, the CRAN or vBBUP may implement a RAN function split, such as a PDCP split wherein RRC and PDCP layers are operated by the CRAN/vBBUP and other L2 protocol entities are operated by individual RAN nodes (e.g., RAN node 818 or RAN node 820); a MAC/PHY split wherein RRC, PDCP, RLC, and MAC layers are operated by the CRAN/vBBUP and the PHY layer is operated by individual RAN nodes (e.g., RAN node 818 or RAN node 820); or a "lower PHY" split wherein RRC, PDCP, RLC, MAC layers and upper portions of the PHY layer are operated by the CRAN/vBBUP and lower portions of the PHY layer are operated by individual RAN nodes. This virtualized framework allows the freed-up processor cores of the RAN node 818 or RAN node 820 to perform other virtualized applications. In some implementations, an individual RAN node may represent individual gNB-DUs that are connected to a gNB-CU via individual F1 interfaces (not shown by FIG. 8). In these implementations, the gNB-DUs may include one or more remote radio heads or RFEMs, and the gNB-CU may be operated by a server that is located in the (R)AN 816 (not shown) or by a server pool in a similar manner as the CRAN/vBBUP. Additionally, or alternatively, one or more of the RAN node 818 or RAN node 820 may be next generation eNBs (ng-eNBs), which are RAN nodes that provide E-UTRA user plane and control plane protocol terminations toward the UE 802 and UE 804, and are connected to an SGC via an NG interface (discussed infra). In V2X scenarios one or more of the RAN node 818 or RAN node 820 may be or act as RSUs.

The term "Road Side Unit" or "RSU" may refer to any transportation infrastructure entity used for V2X communications. An RSU may be implemented in or by a suitable RAN node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Direct Short Range Communications (DSRC) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communication. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

The RAN node 818 and/or the RAN node 820 can terminate the air interface protocol and can be the first point of contact for the UE 802 and UE 804. In some embodiments, the RAN node 818 and/or the RAN node 820 can fulfill various logical functions for the (R)AN 816 including, but not limited to, radio network controller (RNC) functions such as radio bearer management, uplink and downlink dynamic radio resource management and data packet scheduling, and mobility management.

In embodiments, the UE 802 and UE 804 can be configured to communicate using OFDM communication signals with each other or with the RAN node 818 and/or the RAN node 820 over a multicarrier communication channel in accordance with various communication techniques, such as, but not limited to, an OFDMA communication technique (e.g., for downlink communications) or a SC-FDMA communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from the RAN node 818 and/or the RAN node 820 to the UE 802 and UE 804, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

According to various embodiments, the UE 802 and UE 804 and the RAN node 818 and/or the RAN node 820 communicate data (for example, transmit and receive) over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UE 802 and UE 804 and the RAN node 818 or RAN node 820 may operate using LAA, eLAA, and/or feLAA mechanisms. In these implementations, the UE 802 and UE 804 and the RAN node 818 or RAN node 820 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol.

LBT is a mechanism whereby equipment (for example, UE 802 and UE 804, RAN node 818 or RAN node 820, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA Here, when a WLAN node (e.g., a mobile station (MS) such as UE 802, AP 812, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (μs); however, the size of the CWS and a MCOT (for example, a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL.

CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 802 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The PDSCH carries user data and higher-layer signaling to the UE 802 and UE 804. The PDCCH carries information about the transport format and resource allocations related to the PDSCH channel, among other things. It may also inform the UE 802 and UE 804 about the transport format, resource allocation, and HARQ information related to the uplink shared channel. Typically, downlink scheduling (assigning control and shared channel resource blocks to the UE 804 within a cell) may be performed at any of the RAN node 818 or RAN node 820 based on channel quality information fed back from any of the UE 802 and UE 804. The downlink resource assignment information may be sent on the PDCCH used for (e.g., assigned to) each of the UE 802 and UE 804.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 818 or RAN node 820 may be configured to communicate with one another via interface 822. In embodiments where the system 800 is an LTE system (e.g., when CN 830 is an EPC), the interface 822 may be an X2 interface. The X2 interface may be defined between two or more RAN nodes (e.g., two or more eNBs and the like) that connect to an EPC, and/or between two eNBs connecting to the EPC. In some implementations, the X2 interface may include an X2 user plane interface (X2-U) and an X2 control plane interface (X2-C). The X2-U may provide flow control mechanisms for user data packets transferred over the X2 interface, and may be used to communicate information about the delivery of user data between eNBs. For example, the X2-U may provide specific sequence number information for user data transferred from a MeNB to an SeNB; information about successful in sequence delivery of PDCP PDUs to a UE 802 from an SeNB for user data; information of PDCP PDUs that were not delivered to a UE 802; information about a current minimum desired buffer size at the Se NB for transmitting to the UE user data; and the like. The X2-C may provide intra-LTE access mobility function-ality, including context transfers from source to target eNBs, user plane transport control, etc.; load management func-tionality; as well as inter-cell interference coordination functionality.

In embodiments where the system 800 is a SG or NR system (e.g., when CN 830 is an SGC), the interface 822 may be an Xn interface. The Xn interface is defined between two or more RAN nodes (e.g., two or more gNBs and the like) that connect to SGC, between a RAN node 818 (e.g., a gNB) connecting to SGC and an eNB, and/or between two eNBs connecting to (e.g., CN 830). In some implementa-tions, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 802 in a connected mode (e.g., CM-CONNECTED) including functionality to man-age the UE mobility for connected mode between one or more RAN node 818 or RAN node 820. The mobility support may include context transfer from an old (source) serving RAN node 818 to new (target) serving RAN node 820; and control of user plane tunnels between old (source) serving RAN node 818 to new (target) serving RAN node 820. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport net-work layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 816 is shown to be communicatively coupled to a core network-in this embodiment, CN 830. The CN 830 may comprise one or more network elements 832, which are configured to offer various data and telecommunications services to customers/subscribers (e.g., users of UE 802 and UE 804) who are connected to the CN 830 via the (R)AN 816. The components of the CN 830 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via execut-able instructions stored in one or more computer-readable storage mediums (described in further detail below). A logical instantiation of the CN 830 may be referred to as a network slice, and a logical instantiation of a portion of the CN 830 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 834 may be an element offering applications that use IP bearer resources with the core network (e.g., UMTS PS domain, LTE PS data services, etc.). The application server 834 can also be configured to support one or more communication services (e.g., VoIP sessions, PTT sessions, group communication sessions, social networking services, etc.) for the UE 802 and UE 804 via the EPC. The application server 834 may communicate with the CN 830 through an IP communications interface 836.

In embodiments, the CN 830 may be an SGC, and the (R)AN 116 may be connected with the CN 830 via an NG interface 824. In embodiments, the NG interface 824 may be split into two parts, an NG user plane (NG-U) interface 826, which carries traffic data between the RAN node 818 or RAN node 820 and a UPF, and the S1 control plane (NG-C) interface 828, which is a signaling interface between the RAN node 818 or RAN node 820 and AMFs.

In embodiments, the CN 830 may be a SG CN, while in other embodiments, the CN 830 may be an EPC). Where CN 830 is an EPC, the (R)AN 116 may be connected with the CN 830 via an S1 interface 824. In embodiments, the S1 interface 824 may be split into two parts, an S1 user plane (S1-U) interface 826, which carries traffic data between the RAN node 818 or RAN node 820 and the S-GW, and the S1-MME interface 828, which is a signaling interface between the RAN node 818 or RAN node 820 and MMEs.

Figure 9:
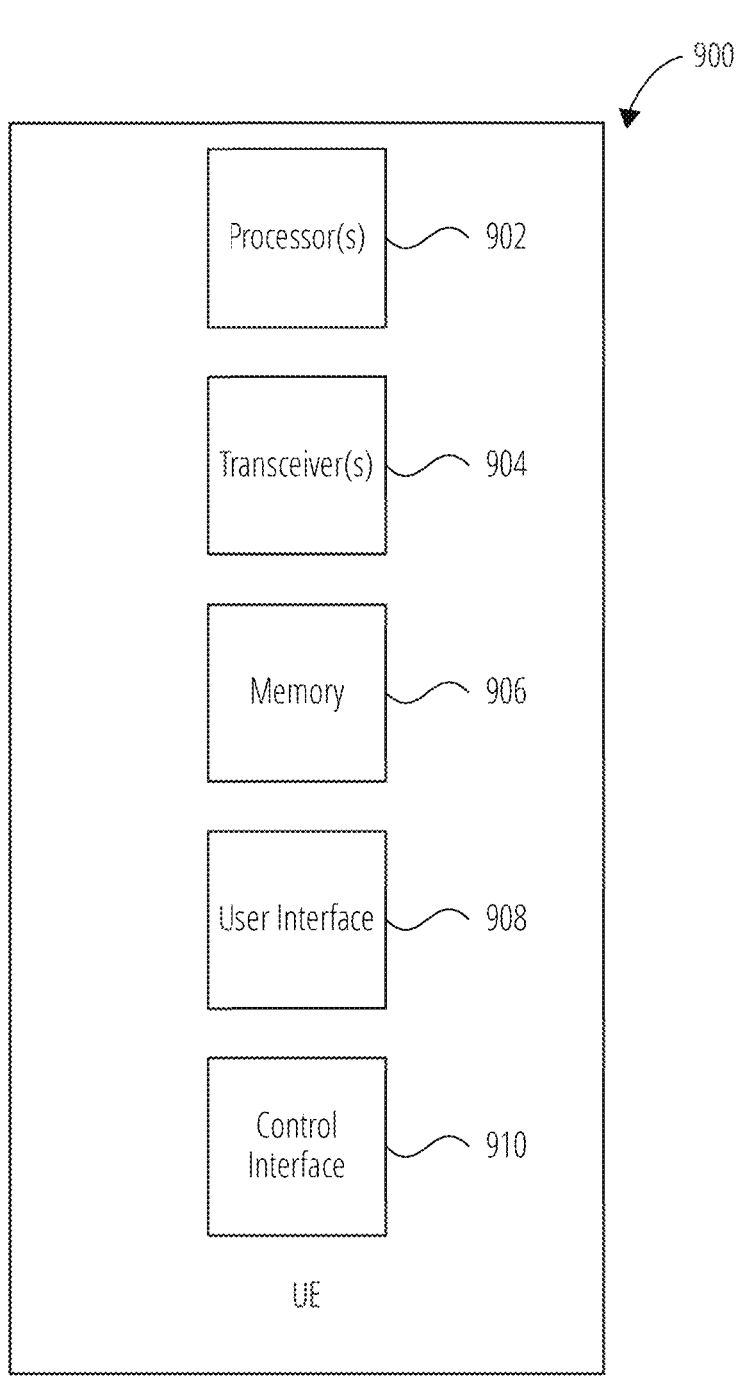
FIG. 9 illustrates a user equipment (UE) in accordance with one embodiment.

FIG. 9 is a block diagram of an example UE 900 config-urable according to various embodiments of the present disclosure, including by execution of instructions on a computer-readable medium that correspond to any of the example methods and/or procedures described herein. The UE 900 comprises one or more processor 902, transceiver 904, memory 906, user interface 908, and control interface 910.

The one or more processor 902 may include, for example, an application processor, an audio digital signal processor, a central processing unit, and/or one or more baseband pro-cessors. Each of the one or more processor 902 may include internal memory and/or may include interface(s) to commu-nication with external memory (including the memory 906). The internal or external memory can store software code, programs, and/or instructions for execution by the one or more processor 902 to configure and/or facilitate the UE 900 to perform various operations, including operations described herein. For example, execution of the instructions can configure the UE 900 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 904, user interface 908, and/or control interface 910. As another example, the one or more processor 902 may execute program code stored in the memory 906 or other memory that corresponds to MAC, RLC, PDCP, and RRC layer protocols standardized by 3GPP (e.g., for NR and/or LTE). As a further example, the processor 902 may execute program code stored in the memory 906 or other memory that, together with the one or more transceiver 904, imple-ments corresponding PHY layer protocols, such as Orthogo-nal Frequency Division Multiplexing (OFDM), Orthogonal Frequency Division Multiple Access (OFDMA), and Single-Carrier Frequency Division Multiple Access (SC-FDMA).

The memory 906 may comprise memory area for the one or more processor 902 to store variables used in protocols, configuration, control, and other functions of the UE 900, including operations corresponding to, or comprising, any of the example methods and/or procedures described herein. Moreover, the memory 906 may comprise non-volatile memory (e.g., flash memory), volatile memory (e.g., static or dynamic RAM), or a combination thereof. Furthermore, the memory 906 may interface with a memory slot by which removable memory cards in one or more formats (e.g., SD Card, Memory Stick, Compact Flash, etc.) can be inserted and removed.

The one or more transceiver 904 may include radio-frequency transmitter and/or receiver circuitry that facilitates the UE 900 to communicate with other equipment supporting like wireless communication standards and/or protocols. For example, the one or more transceiver 904 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 902. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 904 includes a transmitter and a receiver that enable a device to communicate with various 5G/NR networks according to various protocols and/or methods proposed for standardization by 3GPP and/or other standards bodies. For example, such functionality can operate cooperatively with the one or more processor 902 to implement a PHY layer based on OFDM, OFDMA, and/or SC-FDMA technologies, such as described herein with respect to other figures.

The user interface 908 may take various forms depending on particular embodiments, or can be absent from the UE 900. In some embodiments, the user interface 908 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 900 may comprise a tablet computing device including a larger touchscreen display. In such embodiments, one or more of the mechanical features of the user interface 908 may be replaced by comparable or functionally equivalent virtual user interface features (e.g., virtual keypad, virtual buttons, etc.) implemented using the touchscreen display, as familiar to persons of ordinary skill in the art. In other embodiments, the UE 900 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 900 having a touch screen display are capable of receiving user inputs, such as inputs related to exemplary methods and/or procedures described herein or otherwise known to persons of ordinary skill in the art.

In some exemplary embodiments of the present disclosure, the UE 900 may include an orientation sensor, which can be used in various ways by features and functions of the UE 900. For example, the UE 900 can use outputs of the orientation sensor to determine when a user has changed the physical orientation of the UE 900's touch screen display. An indication signal from the orientation sensor can be available to any application program executing on the UE 900, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 910 may take various forms depending on particular embodiments. For example, the control interface 910 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 910 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 900 may include more functionality than is shown in FIG. 9 including, for example, a video and/or still-image camera, microphone, media player and/or recorder, etc. Moreover, the one or more transceiver 904 may include circuitry for communication using additional radio-frequency communication standards including Bluetooth, GPS, and/or others. Moreover, the one or more processor 902 may execute software code stored in the memory 906 to control such additional functionality. For example, directional velocity and/or position estimates output from a GPS receiver can be available to any application program executing on the UE 900, including various exemplary methods and/or computer-readable media according to various exemplary embodiments of the present disclosure.

Figure 10:
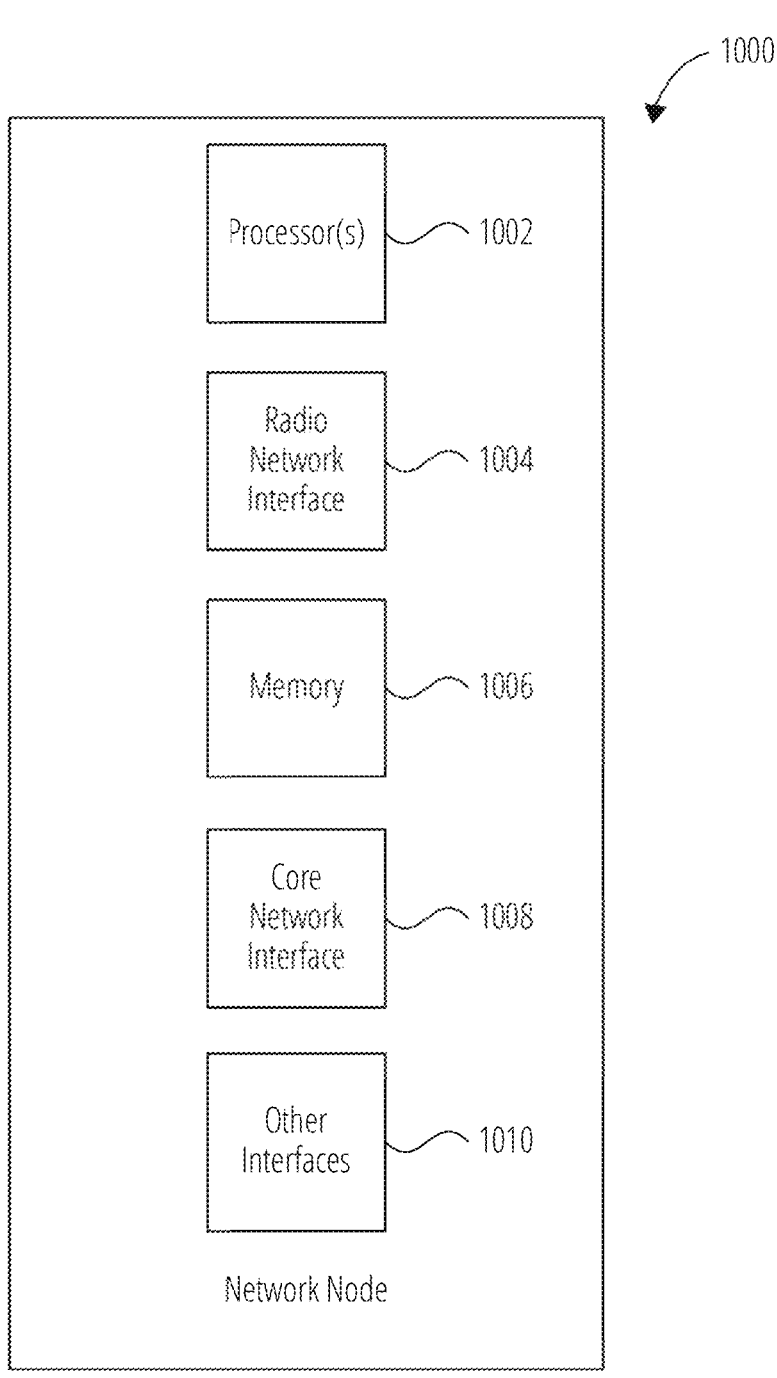
FIG. 10 illustrates a network node in accordance with one embodiment.

FIG. 10 is a block diagram of an example network node 1000 configurable according to various embodiments of the present disclosure, including by execution of instructions on a computer-readable medium that correspond to any of the example methods and/or procedures described herein.

The network node 1000 includes a one or more processor 1002, a radio network interface 1004, a memory 1006, a core network interface 1008, and other interfaces 1010. The network node 1000 may comprise, for example, a base station, eNB, gNB, access node, or component thereof.

The one or more processor 1002 may include any type of processor or processing circuitry and may be configured to perform an of the methods or procedures disclosed herein. The memory 1006 may store software code, programs, and/or instructions executed by the one or more processor 1002 to configure the network node 1000 to perform various operations, including operations described herein. For example, execution of such stored instructions can configure the network node 1000 to communicate with one or more other devices using protocols according to various embodiments of the present disclosure, including one or more methods and/or procedures discussed above. Furthermore, execution of such stored instructions can also configure and/or facilitate the network node 1000 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 1004 and the core network interface 1008. By way of example and without limitation, the core network interface 1008 comprise an S1 interface and the radio network interface 1004 may comprise a Uu interface, as standardized by 3GPP. The memory 1006 may also store variables used in protocols, configuration, control, and other functions of the network node 1000. As such, the memory 1006 may comprise non-volatile memory (e.g., flash memory, hard disk, etc.), volatile memory (e.g., static or dynamic RAM), network-based (e.g., "cloud") storage, or a combination thereof.

The radio network interface 1004 may include transmitters, receivers, signal processors, ASICs, antennas, beamforming units, and other circuitry that enables network node 1000 to communicate with other equipment such as, in some embodiments, a plurality of compatible user equipment (UE). In some embodiments, the network node 1000 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 1004 may include a PHY layer based on OFDM, OFDMA, and/or SC-FDMA technologies. In some embodiments, the functionality of such a PHY layer can be provided cooperatively by the radio network interface 1004 and the one or more processor 1002.

The core network interface 1008 may include transmitters, receivers, and other circuitry that enables the network node 1000 to communicate with other equipment in a core network such as, in some embodiments, circuit-switched (CS) and/or packet-switched Core (PS) networks. In some embodiments, the core network interface 1008 may include the S1 interface standardized by 3GPP. In some embodiments, the core network interface 1008 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 1008 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 1010 may include transmitters, receivers, and other circuitry that enables the network node 1000 to communicate with external networks, computers, databases, and the like for purposes of operations, administration, and maintenance of the network node 1000 or other network equipment operably connected thereto.

Figure 11:
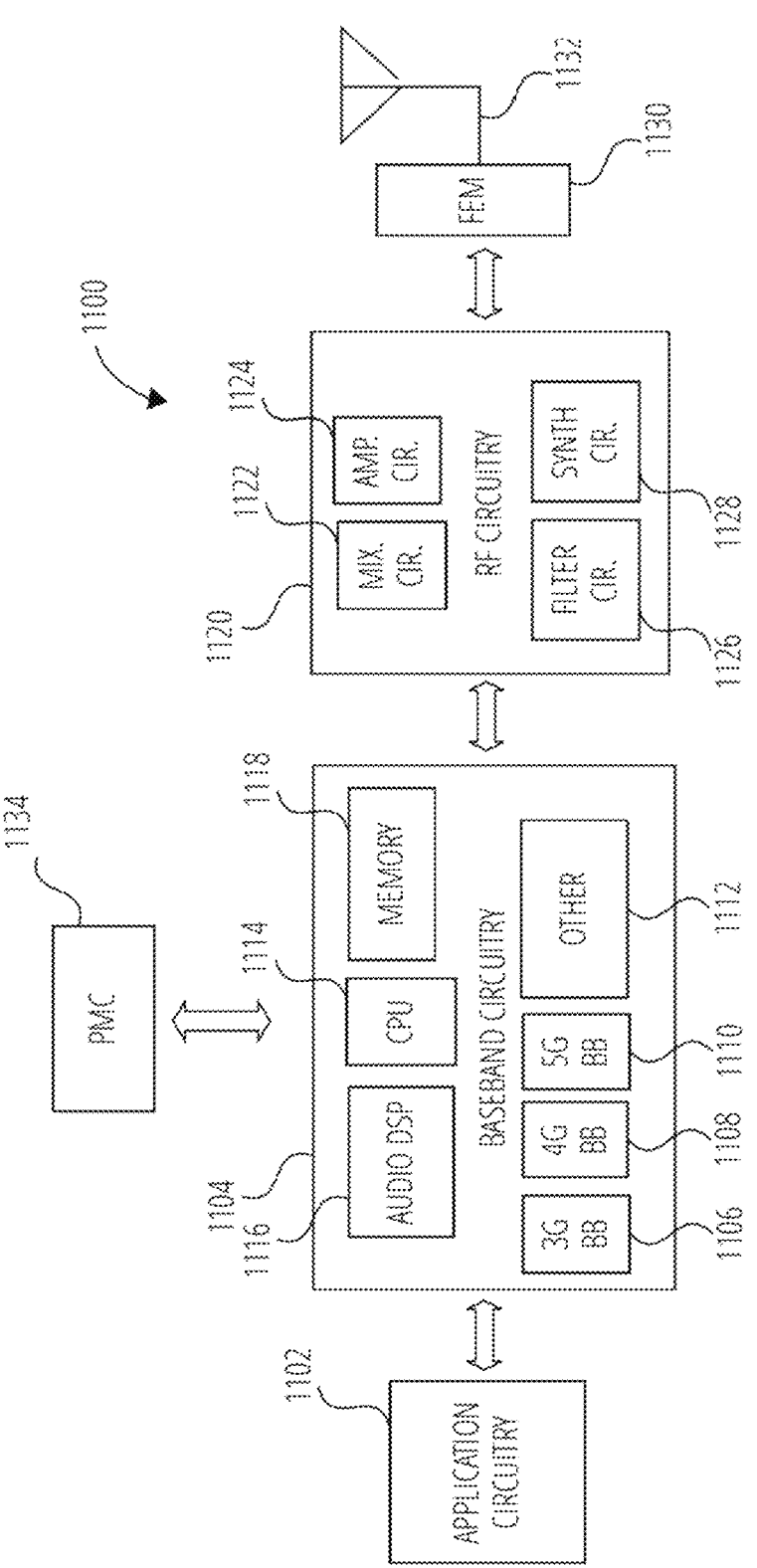
FIG. 11 illustrates a device in accordance with one embodiment.

FIG. 11 illustrates example components of a device 1100 in accordance with some embodiments. In some embodiments, the device 1100 may include application circuitry 1102, baseband circuitry 1104, Radio Frequency (RF) circuitry (shown as RF circuitry 1120), front-end module (FEM) circuitry (shown as FEM circuitry 1130), one or more antennas 1132, and power management circuitry (PMC) (shown as PMC 1134) coupled together at least as shown. The components of the illustrated device 1100 may be included in a UE or a RAN node. In some embodiments, the device 1100 may include fewer elements (e.g., a RAN node may not utilize application circuitry 1102, and instead include a processor/controller to process IP data received from an EPC). In some embodiments, the device 1100 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1102 may include one or more application processors. For example, the application circuitry 1102 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1100. In some embodiments, processors of application circuitry 1102 may process IP data packets received from an EPC.

The baseband circuitry 1104 may include circuitry such as, but not limited to, one or more single-core or multi-core processors. The baseband circuitry 1104 may include one or more baseband processors or control logic to process baseband signals received from a receive signal path of the RF circuitry 1120 and to generate baseband signals for a transmit signal path of the RF circuitry 1120. The baseband circuitry 1104 may interface with the application circuitry 1102 for generation and processing of the baseband signals and for controlling operations of the RF circuitry 1120. For example, in some embodiments, the baseband circuitry 1104 may include a third generation (3G) baseband processor (3G baseband processor 1106), a fourth generation (4G) baseband processor (4G baseband processor 1108), a fifth generation (5G) baseband processor (5G baseband processor 1110), or other baseband processor(s) 1112 for other existing generations, generations in development or to be developed in the future (e.g., second generation (2G), sixth generation (6G), etc.). The baseband circuitry 1104 (e.g., one or more of baseband processors) may handle various radio control functions that enable communication with one or more radio networks via the RF circuitry 1120. In other embodiments, some or all of the functionality of the illustrated baseband processors may be included in modules stored in the memory 1118 and executed via a Central Processing Unit (CPU 1114). The radio control functions may include, but are not limited to, signal modulation/demodulation, encoding/decoding, radio frequency shifting, etc. In some embodiments, modulation/demodulation circuitry of the baseband circuitry 1104 may include Fast-Fourier Transform (FFT), precoding, or constellation mapping/demapping functionality. In some embodiments, encoding/decoding circuitry of the baseband circuitry 1104 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1104 may include a digital signal processor (DSP), such as one or more audio DSP(s) 1116. The one or more audio DSP(s) 1116 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1104 and the application circuitry 1102 may be implemented together such as, for example, on a system on a chip (SOC).

In some embodiments, the baseband circuitry 1104 may provide for communication compatible with one or more radio technologies. For example, in some embodiments, the baseband circuitry 1104 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 1104 is configured to support radio communications of more than one wireless protocol may be referred to as multi-mode baseband circuitry.

The RF circuitry 1120 may enable communication with wireless networks using modulated electromagnetic radiation through a non-solid medium. In various embodiments, the RF circuitry 1120 may include switches, filters, amplifiers, etc. to facilitate the communication with the wireless network. The RF circuitry 1120 may include a receive signal path which may include circuitry to down-convert RF signals received from the FEM circuitry 1130 and provide baseband signals to the baseband circuitry 1104. The RF circuitry 1120 may also include a transmit signal path which may include circuitry to up-convert baseband signals provided by the baseband circuitry 1104 and provide RF output signals to the FEM circuitry 1130 for transmission.

In some embodiments, the receive signal path of the RF circuitry 1120 may include mixer circuitry 1122, amplifier circuitry 1124 and filter circuitry 1126. In some embodiments, the transmit signal path of the RF circuitry 1120 may include filter circuitry 1126 and mixer circuitry 1122. The RF circuitry 1120 may also include synthesizer circuitry 1128 for synthesizing a frequency for use by the mixer circuitry 1122 of the receive signal path and the transmit signal path. In some embodiments, the mixer circuitry 1122 of the receive signal path may be configured to down-convert RF signals received from the FEM circuitry 1130 based on the synthesized frequency provided by synthesizer circuitry 1128. The amplifier circuitry 1124 may be configured to amplify the down-converted signals and the filter circuitry 1126 may be a low-pass filter (LPF) or band-pass filter (BPF) configured to remove unwanted signals from the down-converted signals to generate output baseband signals. Output baseband signals may be provided to the baseband circuitry 1104 for further processing. In some embodiments, the output baseband signals may be zero-frequency baseband signals, although this is not a requirement. In some embodiments, the mixer circuitry 1122 of the receive signal path may comprise passive mixers, although the scope of the embodiments is not limited in this respect.

In some embodiments, the mixer circuitry 1122 of the transmit signal path may be configured to up-convert input baseband signals based on the synthesized frequency provided by the synthesizer circuitry 1128 to generate RF output signals for the FEM circuitry 1130. The baseband signals may be provided by the baseband circuitry 1104 and may be filtered by the filter circuitry 1126.

In some embodiments, the mixer circuitry 1122 of the receive signal path and the mixer circuitry 1122 of the transmit signal path may include two or more mixers and may be arranged for quadrature downconversion and upconversion, respectively. In some embodiments, the mixer circuitry 1122 of the receive signal path and the mixer circuitry 1122 of the transmit signal path may include two or more mixers and may be arranged for image rejection (e.g., Hartley image rejection). In some embodiments, the mixer circuitry 1122 of the receive signal path and the mixer circuitry 1122 may be arranged for direct downconversion and direct upconversion, respectively. In some embodiments, the mixer circuitry 1122 of the receive signal path and the mixer circuitry 1122 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1120 may include analog-to-digital converter (ADC) and digital-to-analog converter (DAC) circuitry and the baseband circuitry 1104 may include a digital baseband interface to communicate with the RF circuitry 1120.

In some dual-mode embodiments, a separate radio IC circuitry may be provided for processing signals for each spectrum, although the scope of the embodiments is not limited in this respect.

In some embodiments, the synthesizer circuitry 1128 may be a fractional-N synthesizer or a fractional N/N+1 synthesizer, although the scope of the embodiments is not limited in this respect as other types of frequency synthesizers may be suitable. For example, synthesizer circuitry 1128 may be a delta-sigma synthesizer, a frequency multiplier, or a synthesizer comprising a phase-locked loop with a frequency divider.

The synthesizer circuitry 1128 may be configured to synthesize an output frequency for use by the mixer circuitry 1122 of the RF circuitry 1120 based on a frequency input and a divider control input. In some embodiments, the synthesizer circuitry 1128 may be a fractional N/N+1 synthesizer.

In some embodiments, frequency input may be provided by a voltage controlled oscillator (VCO), although that is not a requirement. Divider control input may be provided by either the baseband circuitry 1104 or the application circuitry 1102 (such as an applications processor) depending on the desired output frequency. In some embodiments, a divider control input (e.g., N) may be determined from a look-up table based on a channel indicated by the application circuitry 1102.

Synthesizer circuitry 1128 of the RF circuitry 1120 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1128 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1120 may include an IQ/polar converter.

The FEM circuitry 1130 may include a receive signal path which may include circuitry configured to operate on RF signals received from one or more antennas 1132, amplify the received signals and provide the amplified versions of the received signals to the RF circuitry 1120 for further processing. The FEM circuitry 1130 may also include a transmit sign al path which may include circuitry configured to amplify signals for transmission provided by the RF circuitry 1120 for transmission by one or more of the one or more antennas 1132. In various embodiments, the amplification through the transmit or receive signal paths may be done solely in the RF circuitry 1120, solely in the FEM circuitry 1130, or in both the RF circuitry 1120 and the FEM circuitry 1130.

In some embodiments, the FEM circuitry 1130 may include a TX/RX switch to switch between transmit mode and receive mode operation. The FEM circuitry 1130 may include a receive signal path and a transmit signal path. The receive signal path of the FEM circuitry 1130 may include an LNA to amplify received RF signals and provide the amplified received RF signals as an output (e.g., to the RF circuitry 1120). The transmit signal path of the FEM circuitry 1130 may include a power amplifier (PA) to amplify input RF signals (e.g., provided by the RF circuitry 1120), and one or more filters to generate RF signals for subsequent transmission (e.g., by one or more of the one or more antennas 1132).

In some embodiments, the PMC 1134 may manage power provided to the baseband circuitry 1104. In particular, the PMC 1134 may control power-source selection, voltage scaling, battery charging, or DC-to-DC conversion. The PMC 1134 may often be included when the device 1100 is capable of being powered by a battery, for example, when the device 1100 is included in a UE. The PMC 1134 may increase the power conversion efficiency while providing desirable implementation size and heat dissipation characteristics.

FIG. 11 shows the PMC 1134 coupled only with the baseband circuitry 1104. However, in other embodiments, the PMC 1134 may be additionally or alternatively coupled with, and perform similar power management operations for, other components such as, but not limited to, the application circuitry 1102, the RF circuitry 1120, or the FEM circuitry 1130.

In some embodiments, the PMC 1134 may control, or otherwise be part of, various power saving mechanisms of the device 1100. For example, if the device 1100 is in an RRC_Connected state, where it is still connected to the RAN node as it expects to receive traffic shortly, then it may enter a state known as Discontinuous Reception Mode (DRX) after a period of inactivity. During this state, the device 1100 may power down for brief intervals of time and thus save power.

If there is no data traffic activity for an extended period of time, then the device 1100 may transition off to an RRC_Idle state, where it disconnects from the network and does not perform operations such as channel quality feedback, handover, etc. The device 1100 goes into a very low power state and it performs paging where again it periodically wakes up to listen to the network and then powers down again. The device 1100 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1102 and processors of the baseband circuitry 1104 may be used to execute elements of one or more instances of a protocol stack. For example, processors of the baseband circuitry 1104, alone or in combination, may be used to execute Layer 3, Layer 2, or Layer 1 functionality, while processors of the application circuitry 1102 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 12:
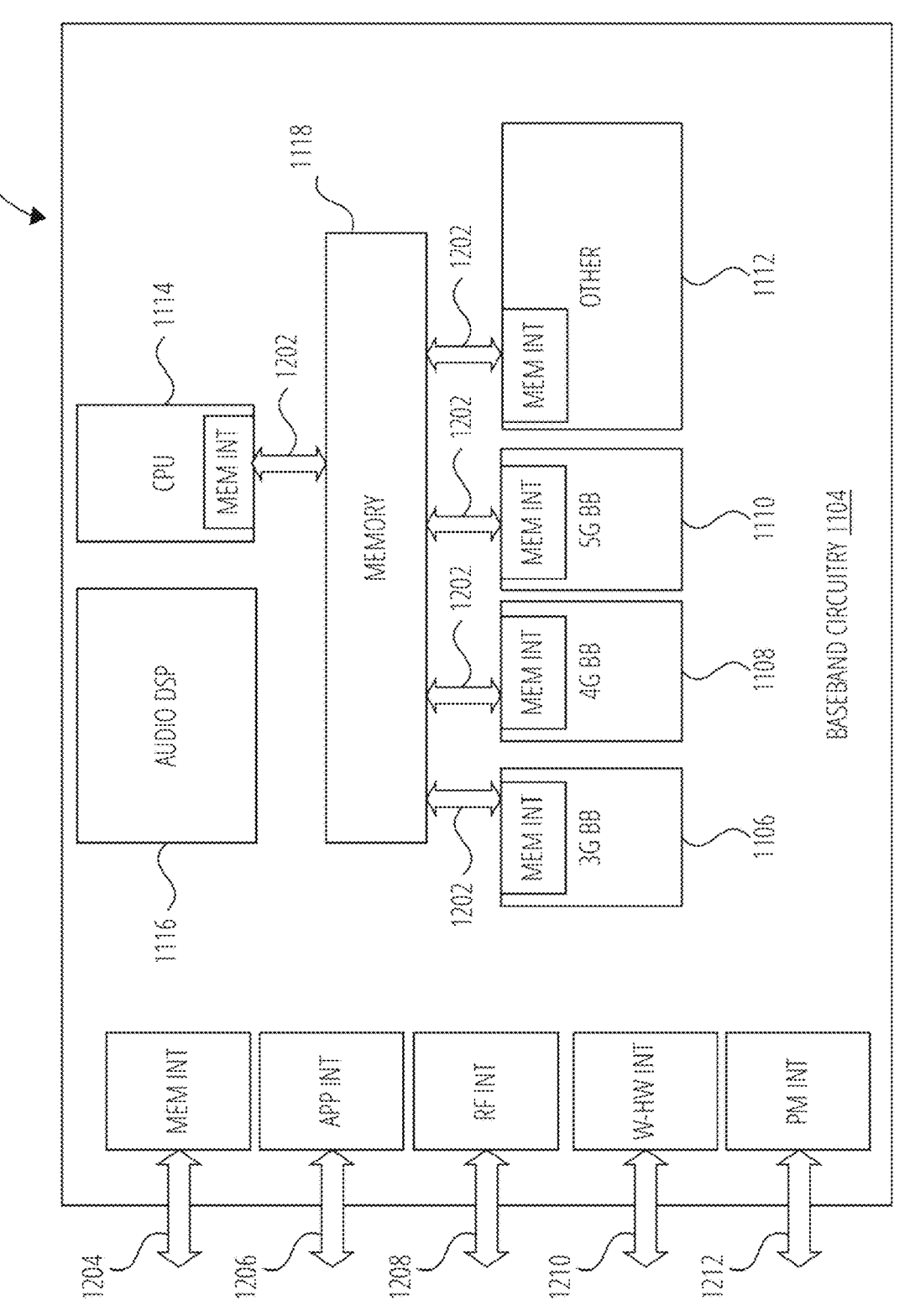
FIG. 12 illustrates example interfaces in accordance with one embodiment.

FIG. 12 illustrates an example 1200 of interfaces of baseband circuitry 1104 in accordance with some embodiments. As discussed above, the baseband circuitry 1104 of FIG. 11 may comprise 3G baseband processor 1106, 4G baseband processor 1108, 5G baseband processor 1110, other baseband processor(s) 1112, CPU 1114, and a memory 1118 utilized by said processors. As illustrated, each of the processors may include a respective memory interface 1202 to send/receive data to/from the memory 1118.

The baseband circuitry 1104 may further include one or more interfaces to communicatively couple to other circuitries/devices, such as a memory interface 1204 (e.g., an interface to send/receive data to/from memory external to the baseband circuitry 1104), an application circuitry interface 1206 (e.g., an interface to send/receive data to/from the application circuitry 1102 of FIG. 11), an RF circuitry interface 1208 (e.g., an interface to send/receive data to/from RF circuitry 1120 of FIG. 11), a wireless hardware connectivity interface 1210 (e.g., an interface to send/receive data to/from Near Field Communication (NFC) components, Bluetooth® components (e.g., Bluetooth® Low Energy), Wi-Fi® components, and other communication components), and a power management interface 1212 (e.g., an interface to send/receive power or control signals to/from the PMC 1134.

Figure 13:
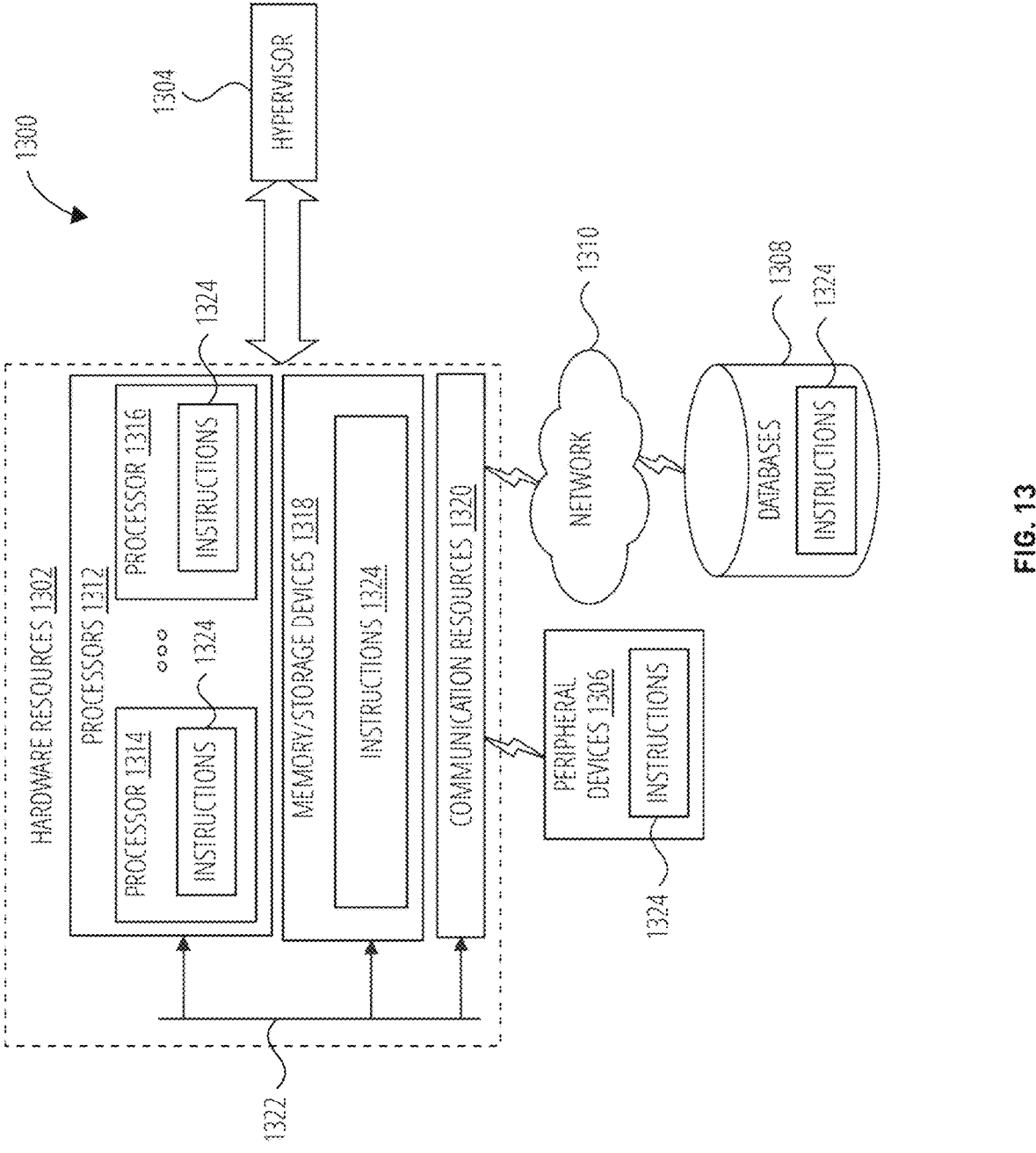
FIG. 13 illustrates components in accordance with one embodiment.

FIG. 13 is a block diagram illustrating components 1300, according to some example embodiments, able to read instructions from a machine-readable or computer-readable medium (e.g., a non-transitory machine-readable storage medium) and perform any one or more of the methodologies discussed herein. Specifically, FIG. 13 shows a diagrammatic representation of hardware resources 1302 including one or more processors 1312 (or processor cores), one or more memory/storage devices 1318, and one or more communication resources 1320, each of which may be communicatively coupled via a bus 1322. For embodiments where node virtualization (e.g., NFV) is utilized, a hypervisor 1304 may be executed to provide an execution environment for one or more network slices/sub-slices to utilize the hardware resources 1302.

The processors 1312 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1314 and a processor 1316.

The memory/storage devices 1318 may include main memory, disk storage, or any suitable combination thereof. The memory/storage devices 1318 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1320 may include interconnection or network interface components or other suitable devices to communicate with one or more peripheral devices 1306 or one or more databases 1308 via a network 1310. For example, the communication resources 1320 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1324 may comprise software, a program, an application, an applet, an app, or other executable code for causing at least any of the processors 1312 to perform any one or more of the methodologies discussed herein. The instructions 1324 may reside, completely or partially, within at least one of the processors 1312 (e.g., within the processor's cache memory), the memory/storage devices 1318, or any suitable combination thereof. Furthermore, any portion of the instructions 1324 may be transferred to the hardware resources 1302 from any combination of the peripheral devices 1306 or the databases 1308. Accordingly, the memory of the processors 1312, the memory/storage devices 1318, the peripheral devices 1306, and the databases 1308 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Example Section

The following examples pertain to further embodiments.

Example 1 is a method of a g Node B (gNB) for beam searching latency reduction, comprising: determining that a first Synchronization Signal Block (SSB) and a second SSB are to be spatially correlated according to a spatial correlation configuration; selecting a first transmit (Tx) beam to transmit the first SSB and a second Tx beam to transmit the second SSB according to the spatial correlation configuration; and transmitting the first SSB with the first Tx beam and the second SSB with the second Tx beam.

Example 2 is the method of Example 1, wherein the spatial correlation configuration is based on a predefined SSB correlation pattern.

Example 3 is the method of Example 1, wherein the spatial correlation configuration causes the transmission of the first SSB to be in the same slot as the transmission of the second SSB.

Example 4 is the method of Example 1, further comprising transmitting, by the gNB, a correlation message for a user equipment (UE), the correlation message comprising spatial correlation information to indicate to the UE that the first SSB and the second SSB are spatially correlated.

Example 5 is the method of Example 4, wherein the spatial correlation information comprises a number of groups of SSBs that are spatially correlated.

Example 6 is the method of Example 4, wherein the spatial correlation information comprises: a list of SSBs; and for at least one SSB in the list, an identification of one or more other SSBs to which the at least one SSB is spatially correlated.

Example 7 is the method of Example 4, wherein the spatial correlation information indicates which of a plurality of predefined SSB correlation patterns is to be used by the gNB.

Example 8 is the method of Example 1, further comprising: preparing a first channel-state information reference signal (CSI-RS) to be sent to a user equipment (UE), wherein the first CSI-RS is quasi co-located (QCLed) with the first SSB.

Example 9 is the method of Example 8, wherein the first CSI-RS is to be sent to the UE at a same time that a second CSI-RS is to be sent to the UE.

Example 10 is a method of a user equipment (UE) for beam searching latency reduction, comprising: determining that first Synchronization Signal Block (SSB) resources and second SSB resources are spatially correlated; measuring the first SSB resources with a first subset of receive (Rx) beams of a plurality of Rx beams; measuring the second SSB resources with a second subset of Rx beams of the plurality of Rx beams; and selecting an Rx beam for both the first SSB resources and the second SSB resources based on the measurements of the first subset of the plurality of Rx beams and the second subset of the plurality of Rx beams.

Example 11 is the method of Example 10, wherein the UE determines that the first SSB resources and the second SSB resources are spatially correlated based on a pre-defined SSB resource correlation pattern.

Example 12 is the method of Example 10, wherein the UE determines that the first SSB resources and the second SSB resources are spatially correlated based on a determination that the first SSB resources and the second SSB resources are in a same subframe.

Example 13 is the method of Example 10, further comprising: receiving a correlation message from a g Node B (gNB), the correlation message comprising spatial correlation information corresponding to the first SSB resources and the second SSB resources; wherein the UE determines that the first SSB resources and the second SSB resources are spatially correlated based on the spatial correlation information.

Example 14 is the method of Example 13, wherein the spatial correlation information comprises a number of groups of SSB resources that are spatially correlated.

Example 15 is the method of Example 13, wherein the spatial correlation information comprises: a list of SSB resources; and for at least one SSB resource in the list, an identification of one or more other SSB resources to which the at least one SSB resource is spatially correlated.

Example 16 is the method of Example 13, wherein the spatial correlation information indicates which of a plurality of predefined SSB resource correlation patterns is to be used by the gNB.

Example 17 is a method of a user equipment (UE) for beam latency reduction, comprising: determining that a first SSB and a second SSB are spatially correlated; determining that a first CSI-RS is quasi co-located (QCLed) with the first SSB; measuring the first CSI-RS on a first receive (Rx) beam; and selecting the first Rx beam for use with the second SSB based on the measurement of the first CSI-RS on the first Rx beam.

Example 18 is the method of Example 17, further comprising: determining that a second CSI-RS is QCLed with the second SSB; measuring the second CSI-RS on a second Rx beam; and selecting the second Rx beam for use with the first SSB based on the measurement of the second CSI-RS on the second Rx beam.

Example 19 is the method of Example 17, further comprising: determining that a second CSI-RS is QCLed with the second SSB; and determining that the first CSI-RS and the second CSI-RS are spatially correlated.

Example 20 is the method of Example 17, wherein the first CSI-RS is received at the UE at a same time as a second CSI-RS is received at the UE.

Example 21 is a method of a g Node B (gNB) for beam latency reduction, comprising: determining that a first Synchronization Signal Block (SSB) to be sent from an assistant transmission reception point (TRP) to a user equipment (UE) and a second SSB to be sent from the assistant TRP to the UE are to be transmitted by the assistant TRP according to a spatial correlation; and transmitting a correlation message to the UE, the correlation message comprising spatial correlation information to be used by the UE to determine that the first SSB and the second SSB as received from the assistant TRP are spatially correlated.

Example 22 is the method of Example 21, wherein the spatial correlation information comprises a number of groups of SSBs that are spatially correlated.

Example 23 is the method of Example 21, wherein the spatial correlation information comprises: a list of SSBs; and for at least one SSB in the list, an identification of one or more other SSBs to which the at least one SSB is spatially correlated.

Example 24 is the method of Example 21, wherein the spatial correlation information indicates which of a plurality of predefined SSB correlation patterns is to be used by the assistant TRP.

Example 25 is the method of Example 21, wherein the correlation message further comprises one or more of: an actually transmitted SSB pattern used by the assistant TRP;

a transmission power of one or more SSBs from the assistant TRP; a relative transmission power of one or more SSBs from the assistant TRP; and a physical cell ID of the assistant TRP.

Example 26 is method of a user equipment (UE) for beam latency reduction, comprising: receiving a correlation message from a g Node B (gNB), the correlation message comprising spatial correlation information indicating that a first Synchronization Signal Block (SSB) transmitted by an assistant Transmission Reception Point (TRP) and a second SSB transmitted by the assistant TRP are spatially correlated; determining that the first SSB and the second SSB are spatially correlated based on the spatial correlation information; measuring the first SSB with a first subset of receive (Rx) beams of a plurality of Rx beams; measuring the second SSB with a second subset of Rx beams of the plurality of Rx beams; and selecting an Rx beam for both the first SSB and the second SSB based on the measurements of the first subset of the plurality of Rx beams and the second subset of the plurality of Rx beams.

Example 27 is the method of Example 26, wherein the spatial correlation information comprises a number of groups of SSBs that are spatially correlated.

Example 28 is the method of Example 26, wherein the spatial correlation information comprises: a list of SSBs; and for at least one SSB in the list, an identification of one or more other SSBs to which the at least one SSB is spatially correlated.

Example 29 is the method of Example 26, wherein the spatial correlation information indicates which of a plurality of predefined SSB correlation patterns is to be used by the assistant TRP.

Example 30 is the method of Example 26, wherein the correlation message further comprises one or more of: an actually transmitted SSB pattern used by the assistant TRP; a transmission power of one or more SSBs from the assistant TRP; a relative transmission power of one or more SSBs from the assistant TRP; and a physical cell ID of the assistant TRP.

Example 31 may include an apparatus comprising means to perform one or more elements of a method described in or related to any of the above Examples, or any other method or process described herein.

Example 32 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 33 may include an apparatus comprising logic, modules, or circuitry to perform one or more elements of a method described in or related to any of the above Examples, or any other method or process described herein.

Example 34 may include a method, technique, or process as described in or related to any of the above Examples, or portions or parts thereof.

Example 35 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 36 may include a signal as described in or related to any of the above Examples, or portions or parts thereof.

Example 37 may include a datagram, packet, frame, segment, protocol data unit (PDU), or message as described in or related to any of the above Examples, or portions or parts thereof, or otherwise described in the present disclosure.

Example 38 may include a signal encoded with data as described in or related to any of the above Examples, or portions or parts thereof, or otherwise described in the present disclosure.

Example 39 may include a signal encoded with a datagram, packet, frame, segment, PDU, or message as described in or related to any of the above Examples, or portions or parts thereof, or otherwise described in the present disclosure.

Example 40 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 41 may include a computer program comprising instructions, wherein execution of the program by a processing element is to cause the processing element to carry out the method, techniques, or process as described in or related to any of the above Examples, or portions thereof.

Example 42 may include a signal in a wireless network as shown and described herein.

Example 43 may include a method of communicating in a wireless network as shown and described herein.

Example 44 may include a system for providing wireless communication as shown and described herein.

Example 45 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. A method of a base station for beam latency reduction, comprising:

determining that a first Synchronization Signal Block (SSB) to be sent from an assistant transmission reception point (TRP) to a user equipment (UE) and a second SSB to be sent from the assistant TRP to the UE are to be transmitted by the assistant TRP according to a spatial correlation; and transmitting a correlation message to the UE, the correlation message comprising spatial correlation information to be used by the UE to determine that the first SSB and the second SSB as received from the assistant TRP are spatially correlated.

2. The method of claim 1, wherein the spatial correlation information comprises a number of groups of SSBs that are spatially correlated.

3. The method of claim 1, wherein the spatial correlation information comprises:

a list of SSBs; and for at least one SSB in the list, an identification of one or more other SSBs to which the at least one SSB is spatially correlated.

4. The method of claim 1, wherein the spatial correlation information indicates which of a plurality of predefined SSB correlation patterns is to be used by the assistant TRP.

5. The method of claim 1, wherein the correlation message further comprises one or more of:

a transmission power of one or more SSBs from the assistant TRP;

a relative transmission power of one or more SSBs from the assistant TRP; and a physical cell ID of the assistant TRP.

6. The method of claim 1, wherein the correlation message further comprises an actually transmitted SSB pattern used by the assistant TRP.

7. A method of a user equipment (UE) for beam latency reduction, comprising:

receiving a correlation message from a base station, the correlation message comprising spatial correlation information indicating that a first Synchronization Signal Block (SSB) transmitted by an assistant Transmission Reception Point (TRP) and a second SSB transmitted by the assistant TRP are spatially correlated;

determining that the first SSB and the second SSB are spatially correlated based on the spatial correlation information;

measuring the first SSB with a first subset of receive (Rx) beams of a plurality of Rx beams;

measuring the second SSB with a second subset of Rx beams of the plurality of Rx beams; and selecting an Rx beam for both the first SSB and the second SSB based on the measurements of the first subset of the plurality of Rx beams and the second subset of the plurality of Rx beams.

8. The method of claim 7, wherein the spatial correlation information comprises a number of groups of SSBs that are spatially correlated.

9. The method of claim 7, wherein the spatial correlation information comprises:

a list of SSBs; and for at least one SSB in the list, an identification of one or more other SSBs to which the at least one SSB is spatially correlated.

10. The method of claim 7, wherein the spatial correlation information indicates which of a plurality of predefined SSB correlation patterns is to be used by the assistant TRP.

11. The method of claim 7, wherein the correlation message further comprises one or more of:

an actually transmitted SSB pattern used by the assistant TRP; and a physical cell ID of the assistant TRP.

12. The method of claim 7, wherein the correlation message further comprises a transmission power of one or more SSBs from the assistant TRP.

13. The method of claim 7, wherein the correlation message further comprises a relative transmission power of one or more SSBs from the assistant TRP.

14. An apparatus of a user equipment (UE), comprising:

one or more processors; and a memory storing instructions that, when executed by the one or more processors, configure the UE to:

receive a correlation message from a base station, the correlation message comprising spatial correlation information indicating that a first Synchronization Signal Block (SSB) transmitted by an assistant Transmission Reception Point (TRP) and a second SSB transmitted by the assistant TRP are spatially correlated;

determine that the first SSB and the second SSB are spatially correlated based on the spatial correlation information;

measure the first SSB with a first subset of receive (Rx) beams of a plurality of Rx beams;

measure the second SSB with a second subset of Rx beams of the plurality of Rx beams; and select an Rx beam for both the first SSB and the second SSB based on the measurements of the first subset of the plurality of Rx beams and the second subset of the plurality of Rx beams.

15. The apparatus of claim 14, wherein the spatial correlation information comprises a number of groups of SSBs that are spatially correlated.

16. The apparatus of claim 14, wherein the spatial correlation information comprises:

a list of SSBs; and for at least one SSB in the list, an identification of one or more other SSBs to which the at least one SSB is spatially correlated.

17. The apparatus of claim 14, wherein the spatial correlation information indicates which of a plurality of predefined SSB correlation patterns is to be used by the assistant TRP.

18. The apparatus of claim 14, wherein the correlation message further comprises one or more of:

an actually transmitted SSB pattern used by the assistant TRP; and a transmission power of one or more SSBs from the assistant TRP; and a relative transmission power of one or more SSBs from the assistant TRP.

19. The apparatus of claim 14, wherein the correlation message further comprises a physical cell ID of the assistant TRP.

\* \* \* \* \*